United States Patent
Maeda et al.

(10) Patent No.: US 8,582,864 B2
(45) Date of Patent: Nov. 12, 2013

(54) FAULT INSPECTION METHOD

(75) Inventors: Shunji Maeda, Yokohama (JP); Kaoru Sakai, Yokohama (JP)

(73) Assignee: Hitachi High-Technologies Corporation, Tokyo (JP)

(*) Notice: Subject to any disclaimer, the term of this patent is extended or adjusted under 35 U.S.C. 154(b) by 3 days.

(21) Appl. No.: 13/354,041

(22) Filed: Jan. 19, 2012

(65) Prior Publication Data

US 2012/0207382 A1    Aug. 16, 2012

Related U.S. Application Data

(63) Continuation of application No. 11/655,226, filed on Jan. 19, 2007, now Pat. No. 8,103,087.

(30) Foreign Application Priority Data

Jan. 20, 2006 (JP) .................. 2006-011837
Feb. 8, 2006 (JP) .................. 2006-030417

(51) Int. Cl.
*G06K 9/00* (2006.01)

(52) U.S. Cl.
USPC ................. 382/149; 348/125; 356/237.1

(58) Field of Classification Search
USPC .................. 382/141–152; 250/306–311; 348/86–95, 125–134; 700/95–212; 29/833; 438/16; 356/237.1–237.6, 356/426–431; 702/35–40
See application file for complete search history.

(56) References Cited

U.S. PATENT DOCUMENTS

| 5,038,048 | A | 8/1991 | Maeda et al. |
| 5,539,752 | A * | 7/1996 | Berezin et al. ............. 714/724 |
| 6,232,787 | B1 * | 5/2001 | Lo et al. ................ 324/754.22 |
| 6,912,304 | B1 | 6/2005 | Aghajan |
| 7,075,074 | B2 | 7/2006 | Nam-Koong |
| 7,171,038 | B2 | 1/2007 | Adler et al. |
| 7,912,276 | B2 * | 3/2011 | Shibuya et al. ............. 382/149 |
| 2002/0161534 | A1 | 10/2002 | Adler et al. |
| 2003/0050761 | A1 * | 3/2003 | Okabe et al. .................. 702/82 |
| 2003/0086082 | A1 * | 5/2003 | Lange ....................... 356/237.2 |
| 2005/0200841 | A1 * | 9/2005 | Talbot et al. .............. 356/237.4 |
| 2006/0038987 | A1 | 2/2006 | Maeda et al. |
| 2006/0215902 | A1 * | 9/2006 | Shibuya et al. ............. 382/149 |
| 2007/0025610 | A1 | 2/2007 | Adler et al. |
| 2007/0230768 | A1 | 10/2007 | Adler et al. |
| 2010/0004875 | A1 * | 1/2010 | Urano et al. .................. 702/40 |

FOREIGN PATENT DOCUMENTS

| JP | 05-264467 | 10/1993 |
| JP | 2001-194323 A | 7/2001 |
| JP | 2003-083907 A | 3/2003 |
| JP | 2003-271927 | 9/2003 |
| JP | 2005-338906 | 12/2005 |

OTHER PUBLICATIONS

Office Action issued for the counterpart Japanese application dated Jan. 11, 2011.

(Continued)

*Primary Examiner* — Aaron W Carter
(74) *Attorney, Agent, or Firm* — Antonelli, Terry, Stout & Kraus, LLP.

(57) ABSTRACT

A fault inspection method and apparatus in which the scattergram is separated or objects of comparison are combined in such a manner as to reduce the difference between an inspection object image and a reference image. As a result, the difference between images caused by the thickness difference in the wafer can be tolerated and the false information generation prevented without adversely affecting the sensitivity.

12 Claims, 32 Drawing Sheets

(56) References Cited

OTHER PUBLICATIONS

Office Action issued for the counterpart Japanese application dated May 10, 2011.
Office Action issued for the counterpart Japanese application dated Jan. 4, 2011.
"Subpixel Image Alignment by Interpolation-based increment Sign Correlation", by Kensuke Takeda et al., Dec. 3, 2004.
"Robust Subpixel Image Alignment by Interpolation-based Absolute Gradient Matching", Kensuke Takeda et al., Proceedings of the 11$^{th}$ Japan-Korea Joint Workshop, 2005.

* cited by examiner

FIG.2A
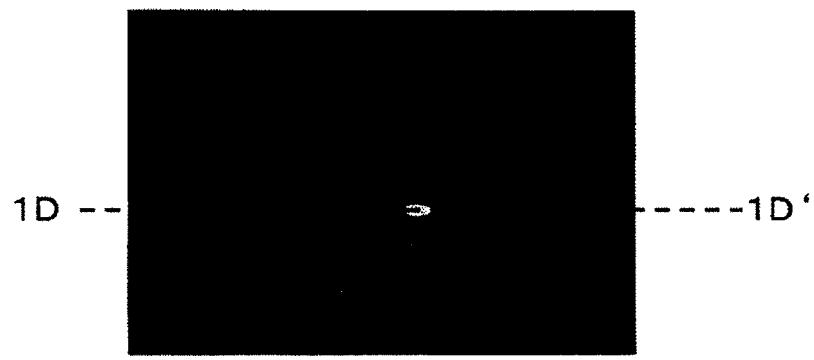
FIG.2B
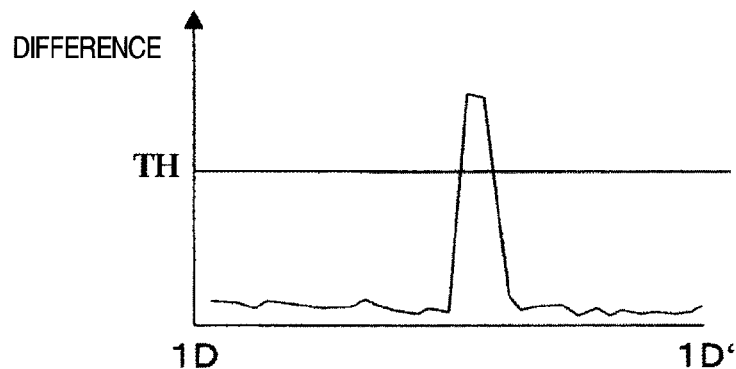
FIG.3A   FIG.3B
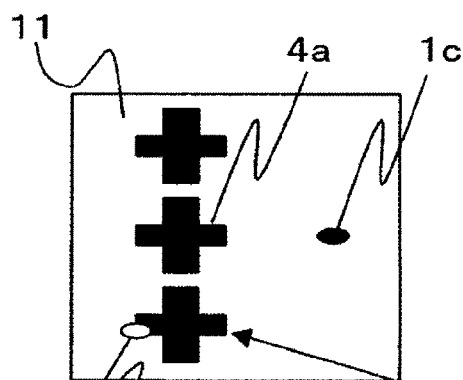
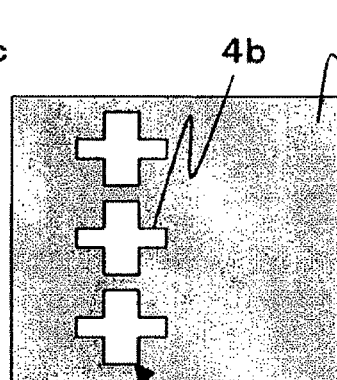
COLOR IRREGULARITIES
(BRIGHTNESS DIFFERENCE DUE
TO THICKNESS CHANGE)

DETECTED IMAGE

BRIGHTNESS DISTRIBUTION OF PIXEL A

BRIGHTNESS DISTRIBUTION OF PIXEL B

3σ (THREE TIMES AS LARGE AS STANDARD DEVIATION)

DIFFERENCE IMAGE BRIGHTNESS DISTRIBUTION (PIXEL A)

FAULT

DIFFERENCE IMAGE BRIGHTNESS DISTRIBUTION (PIXEL B)

COLLECTION OF PLURAL DIE DATA

BRIGHTNESS VARIATION OF EACH PIXEL ($\sigma$)
HISTOGRAM OF BRIGHTNESS VARIATION ($\sigma$) OF CORRESPONDING PIXEL AND DIVISION Scattergram Separation    Grayscale transformation for each category

SCATTERGRAM SEPARATION AND BRIGHTNESS CORRECTION

FIG.21
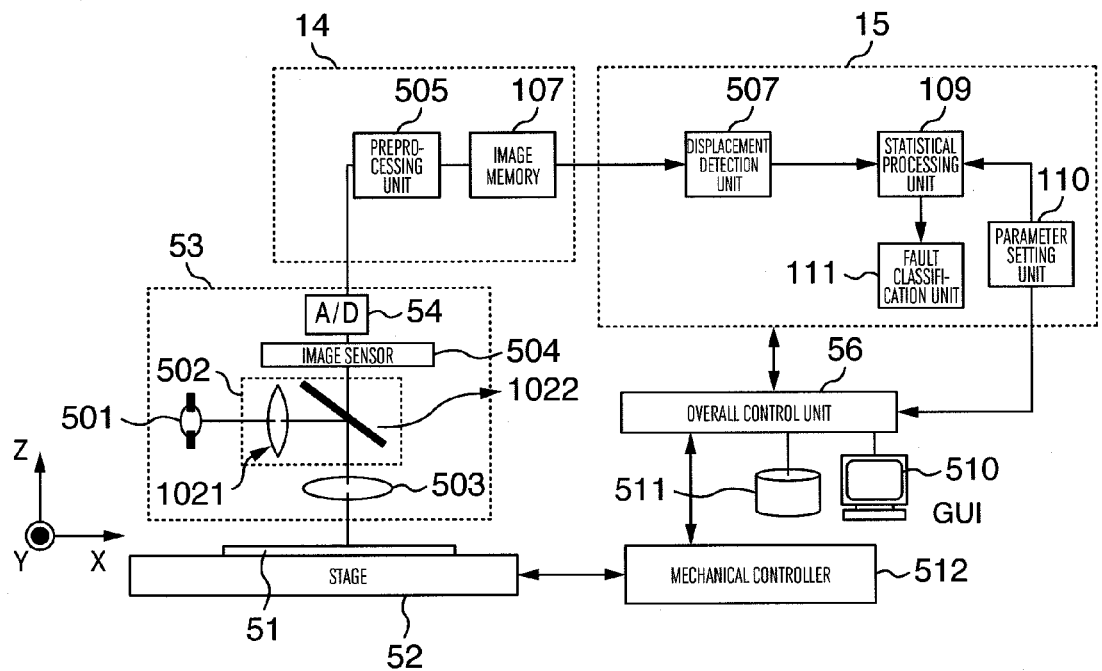
FIG.22A
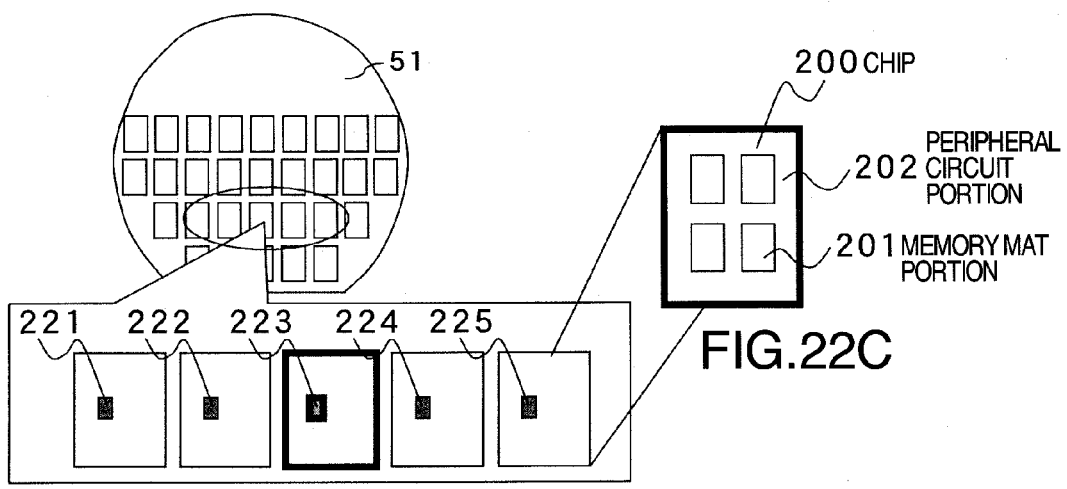
FIG.22B
FIG.22C

FIG.24A
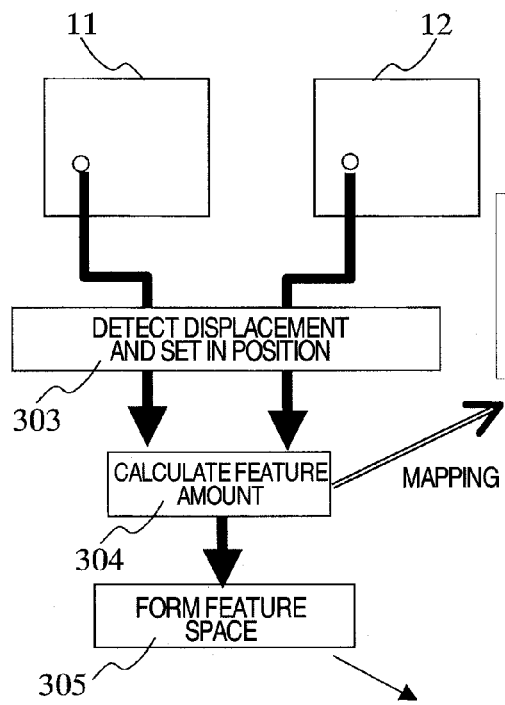
FIG.24B
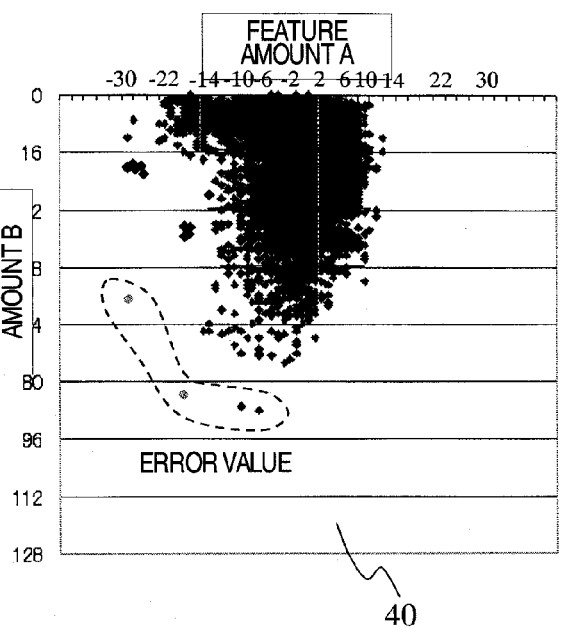
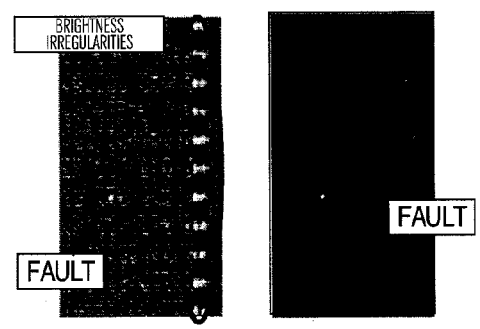
FIG.24C  FIG.24D

FIG.25A FIG.25B
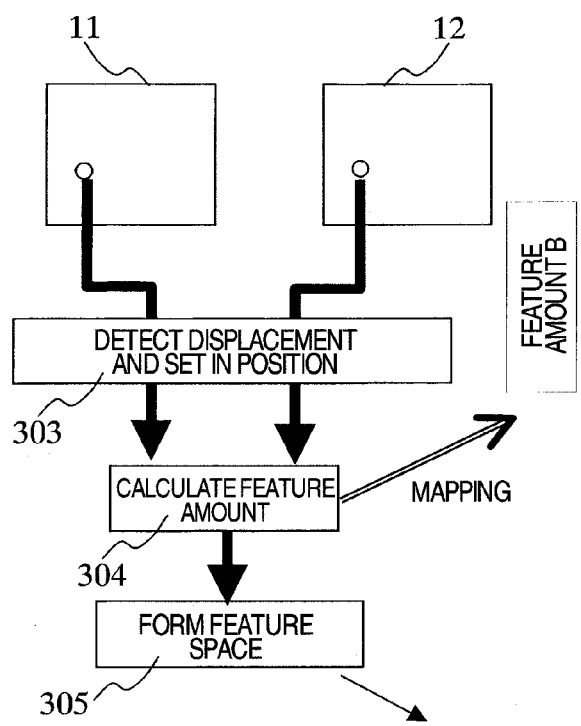
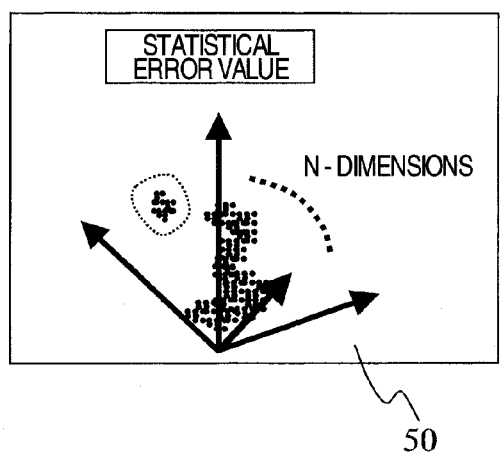
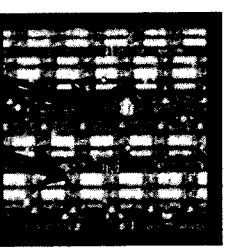 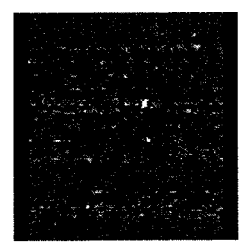
FIG.25C    FIG.25D

BRIGHTNESS DIFFERENCE

PART OF MONITOR SCREEN

PART OF MONITOR SCREEN

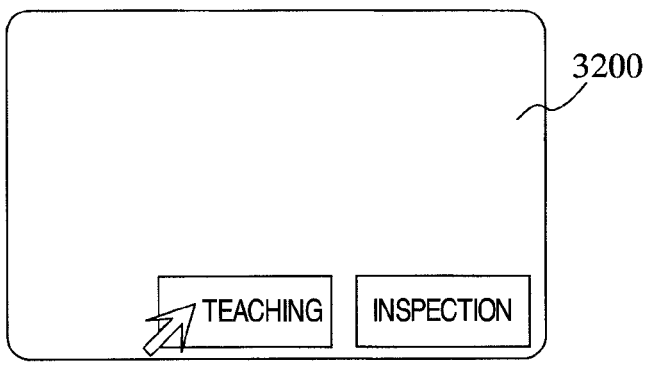
FIG.32A
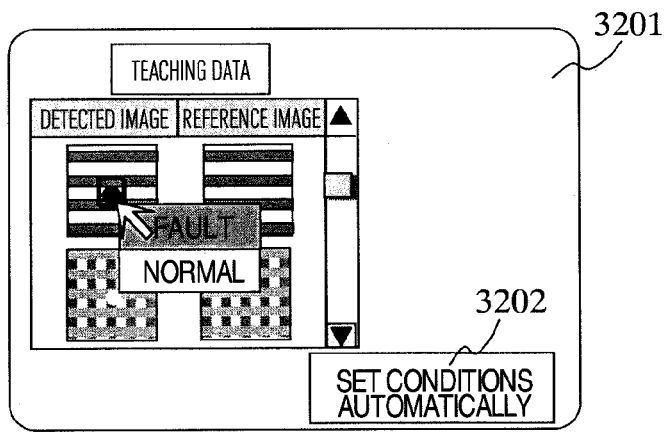
FIG.32B
FIG.32C
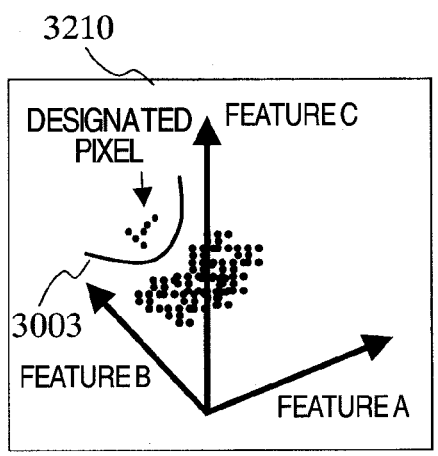
FIG.32D
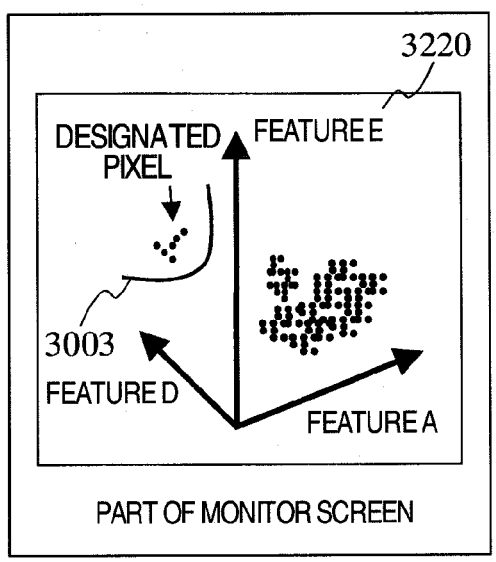

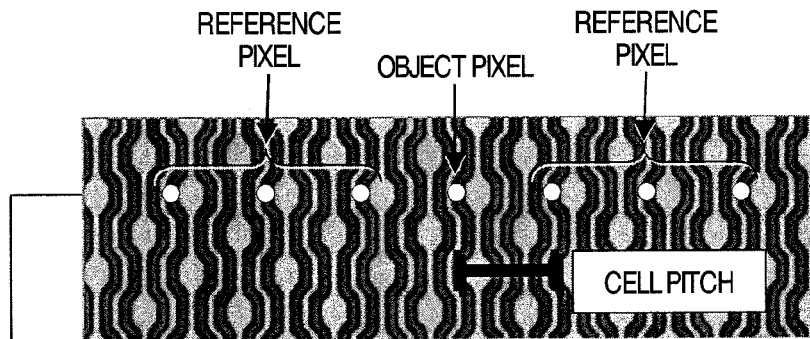
FIG.36A
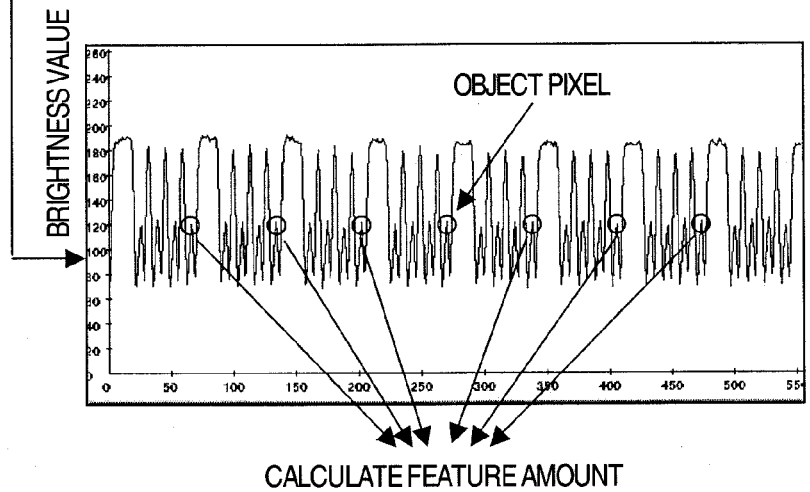
FIG.36B
FIG.39
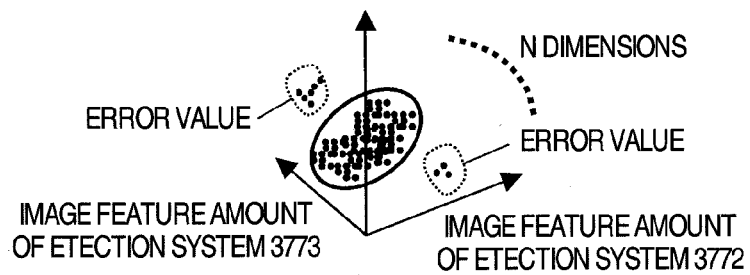

FAULT INSPECTION METHOD

The present application is a Continuation application of U.S. patent application Ser. No. 11/655,226, filed Jan. 19, 2007, now U.S. Pat. No. 8,103,087 issued on Jan. 24, 2012, which claims priority from Japanese Patent Application Nos. JP2006-011837, filed on Jan. 20, 2006, and JP2006-030417, filed on Feb. 8, 2006, the content of which are hereby incorporated by reference into this application.

BACKGROUND OF THE INVENTION

This invention relates to a fault inspection apparatus and method for detecting a fault from the image picked up from the appearance of a specimen, or in particular to a fault inspection method for comparing the image of an object such as a semiconductor wafer, a TFT or a photomask obtained using the lamp light, laser beam or the electron beam with a reference image stored in advance and detecting a fine pattern fault or foreign matter.

The conventional technique for detecting a fault by comparing an image of an object of inspection (hereinafter referred to as the inspection object image) with a reference image is disclosed in JP-A-05-264467. In this conventional technique, images of specimens providing inspection objects having regularly arranged repetitive patterns are sequentially picked up and compared with images delayed in time by the repetitive pattern pitch so that an incoincident portion is detected as a pattern fault.

Actually, however, due to the vibration of a stage or the inclination of the object, the positions of the two images are not necessarily coincident with each other. Therefore, as disclosed in "Kensuke Takeda, Shun'ichi Kaneko, Takayuki Tanaka, Kaoru Sakai, Shunji Maeda, Yasuo Nakagawa: Robust Subpixel Image Alignment by Interpolation-based Increment Sign Matching, Proceedings of View 2004 of Workshop on Vision Technique Application, pp. 16-21, 2004" and "Kensuke Takeda, Shun'ichi Kaneko, Takayuki Tanaka, Kaoru Sakai, Shunji Maeda, Yasuo Nakagawa: Robust Subpixel Image Alignment by Interpolation-based Absolute Gradient Matching, Proceedings of the 11th Japan-Korea Joint Workshop on Frontiers of Computer Vision 2005 (FCV2005), pp. 154-159, 2005" the amount of displacement between the image picked up by the sensor and the image delayed by the repetitive pattern pitch is determined, and after setting the two images in position based on the displacement amount thus determined, the difference between the images is determined and, in the case where the difference is larger than a specified threshold value, a fault is determined, while in the case where the difference is smaller than the threshold, a non-fault, i.e. a normality is determined. This conventional inspection method is explained with the semiconductor wafer appearance inspection as an example. In the semiconductor wafer providing an object of inspection, as shown in FIG. 22A, a multiplicity of chips of the same pattern are arranged regularly. Each chip can be roughly classified into a memory mat portion 201 and a peripheral circuit portion 202 as shown in FIG. 22B. The memory mat portion 201 is a mass of small repetitive patterns (cells), while the peripheral circuit portion 202 is basically a mass of random patterns. Generally, the memory mat portion 201 is high in pattern density and the image obtained by a bright field illumination optical system is darkened. The peripheral circuit portion 202, on the other hand, is low in pattern density, and the image obtained is bright.

In the conventional appearance inspection, the images at the same positions of the adjacent chips such as the areas 222 and 223 in FIG. 22 are compared with each other in the peripheral circuit unit 202, and a portion where the brightness difference is larger than a threshold value is detected as a fault. This inspection method is hereinafter referred to as the chip comparison method. In the memory mat portion 201, on the other hand, the images of the adjacent cells are compared with each other, and a portion where the brightness difference is larger than a threshold value is detected as a fault. This inspection is hereinafter referred to as the cell comparison method.

Also, JP-A-2001-194323 discloses the coaxial epi-illumination/bright field detection method for radiating the DUV light or VUV light through an objective lens using a laser light source.

SUMMARY OF THE INVENTION

The problem of the conventional technique described above is explained below. In FIG. 1A, reference numeral 11 designates an example of an inspection object image, and numeral 12 an example of a reference image. Numeral 1a designates a uniformly bright base area, and numeral 1b an area having a dark pattern on a bright base. Also, the inspection object image 11 has a fault 1c. In this exemplary image, the brightness waveform along line 1D-1D' is as shown in FIG. 1B. The amount of displacement between the images 11 and 12 is determined, and the difference image after setting the images 11 and 12 in position is as shown in FIG. 2A. The difference image is defined as an image indicating the gray-scale difference in accordance with the difference at each corresponding position of the inspection object image and the reference image. Assuming that the portion where the difference value is not less than a specified threshold value TH is defined as a fault as shown in FIG. 2B, only the fault 1c of the inspection object image 11 in FIG. 1 is detected.

In the case where the inspection object is a semiconductor wafer, the flattening process such as CMP (chemical mechanical polishing) causes a delicate difference in pattern thickness. Thus, a brightness difference is caused in the same patterns between the inspection object image 11 and the reference image 12 as indicated by 4a of the inspection object image 11 and 4b of the reference image 12 in FIG. 3. The value of this difference increases as indicated by 4c in FIG. 4A. This is false information, and in order to avoid this detection, it is unavoidable to increase the threshold value TH as shown in FIG. 4B, or set different threshold values for an area having brightness irregularities and an area having no brightness irregularities. In both cases, the threshold value is set in the direction of descending sensitivity. The brightness difference due to the thickness difference may be caused between specific ones of the chips arranged in the wafer or only between specific patterns in each chip. Once the threshold value is set to these local areas, however, the inspection sensitivity as a whole is extremely deteriorated. Further, a great variety of differences causing the brightness difference such as grains (minuscule surface roughness) and the line edge roughness (LER) exist other than the thickness difference in the wafer. FIG. 26 shows a sectional waveform of the brightness at the same positions of two chips to be compared. The brightness variation due to LER exists between the chips. In the conventional comparison inspection using the brightness, the brightness variation is a cause of noises at the time of inspection.

In the case of a semiconductor, as described above, it is a great problem how to process the ambiguous brightness information easily subjected to variations against the highly accurate spatial (positional) information in the sense that the pattern position accuracy is high and the positional information is reliable. On the other hand, faults exist in a great variety of types and can be classified into faults requiring no detection (faults that can be regarded as noises) and faults to be detected. In the appearance inspection, only the fault types desired by the user are required to be extracted from a vast number of faults. This is difficult to realize, however, by the comparison between the brightness difference and the threshold value described above. In contrast, different types of faults often present different appearances in a combination between a factor depending on the inspection object such as material, surface roughness, size or depth on the one hand and a factor dependent on the detection system such as illumination conditions on the other hand.

The object of this invention is to solve the problem of the conventional technique described above and provide a comparative inspection method for comparing an inspection object image with a reference image and detecting an incoincident portion as a fault wherein the data is voted in a scattergram constituting one of multidimensional spaces at the time of brightness comparison, and the scattergram thus obtained is separated based on the features so that the data spread on each separated scattergram is suppressed thereby to make it possible to set a low threshold value. Specifically, the object of the invention is to provide a highly sensitive fault inspection method and apparatus, wherein the scattergram constituting one of the multidimensional spaces is plotted with the ordinate and the abscissa representing the brightness of the inspection object image and the brightness of the reference image, respectively, thereby reducing the false information due to the color shading (color irregularities), or in particular, wherein the pattern brightness irregularities caused by the thickness difference are inspected by combining the brightness between images in the semiconductor wafer inspection, so that the false information due to the brightness irregularities is reduced without increasing the threshold value TH thereby to realize a highly sensitive fault inspection. Although a comparative inspection with the brightness as an object of comparison is explained, the ordinate and the abscissa of the scattergram represent the an object other than brightness in the case where such object is employed for comparison. Alternatively, three or more features are selected to form a multidimensional scattergram. As another alternative, the scattergram may be regarded as a given section of a multidimensional space. The feature amounts selected include the brightness and contrast of the object image or the brightness variations of the corresponding pixels between chips (which are subsequently cut into devices) or cells (repetitive patterns in the chip). Further, a pattern inspection for detecting the fault desired by the user and buried in noises or requiring no detection, with a high sensitivity by changing the sensitivity in accordance with the fault type.

According to this invention, in comparing the inspection object image and the reference image with each other, the feature amounts including the brightness and contrast of each object pixel, the brightness or contrast variations between chips or cells are calculated and voted in a multidimensional space having these features as axes, and a fault is detected using this voting data. As an example, an error value in the feature space is determined as a fault candidate, so that a high sensitivity pattern inspection adapted for a great variety of fault types can be carried out. Also, according to this invention, the feature space is formed by selected ones of a plurality of the feature amounts thereby to adjust the fault type detected. Also, the scattergram is created by voting, and the scattered diagram thus obtained is separated based on the features, while by suppressing the data spread on each scattergram separated, a low threshold value can be set.

Further, there is provided a fault inspection method wherein even in the case where the brightness difference is caused between the same patterns of the images due to the difference of the thickness of the object, a highly sensitive fault inspection is possible with a low threshold value regardless of brightness irregularities by combining the brightness in advance. In general expression, a method employed for combining the object features such as brightness makes possible a highly sensitive inspection and reduce false information without being affected by the incoincidence of the normal portion. Specifically, the scattergram including some features such as the brightness or contrast variations of the object pixels or the brightness variation between dies or cells is separated by other features, and a fault is detected using a plurality of scattergrams separated.

Furthermore, the user teaches the error value not desirous of being detected thereby to prevent the detection of an error value of a similar type. As a result, even in the case where the brightness difference in the same pattern is caused between images due to the difference of the pattern line width, etc., only the desired one can be detected from a great variety of fault types.

Also, the user teaches the absence of a fault thereby to automatically set the threshold value for detecting the error value in such a manner as to cover all the distribution points in the feature space. As a result, the setting of the inspection conditions is simplified while at the same time making it possible to detect the matter other than taught as a fault with high sensitivity.

In addition, by increasing the teachings, the threshold value is optimized and the automatic sensitivity adjustment facilitated.

With these methods, an inspection method is provided for detecting only a fatal fault with high sensitivity for all the inspection object areas at a low threshold value without generating any false information. Further, a fault classification method and an image data compression method are provided. These and other objects, features and advantages of the invention will be apparent from the following more particular description of preferred embodiments of the invention, as illustrated in the accompanying drawings.

BRIEF DESCRIPTION OF THE DRAWINGS

FIGS. 2A and 2B show an example of the conventional threshold setting method, in which FIG. 2A shows a difference image after positioning, and FIG. 2B a diagram showing a brightness waveform thereof.

FIGS. 3A and 3B are diagrams showing an inspection object image 11 and a reference image 12 having different brightness.

FIG. 21 is a diagram showing an example of the configuration of the inspection apparatus.

FIGS. 22A to 22C are diagrams showing the chip configuration and an example of information collection of a plurality of chips.

FIGS. 24A to 24D are diagrams showing an example of error pixel detection in the two-dimensional feature space.

FIGS. 25A to 25D are diagrams showing an example of error pixel detection in the N-dimensional feature space.

FIGS. 32A to 32D are diagrams showing an example of the fault information teaching screen.

FIGS. 36A and 36B are diagrams showing an example of the feature amount calculation for cell comparison.

FIG. 39 is a diagram showing the feature space.

DESCRIPTION OF THE EMBODIMENTS

An embodiment of the invention is explained in detail below with reference to the drawings.

Figure 5:
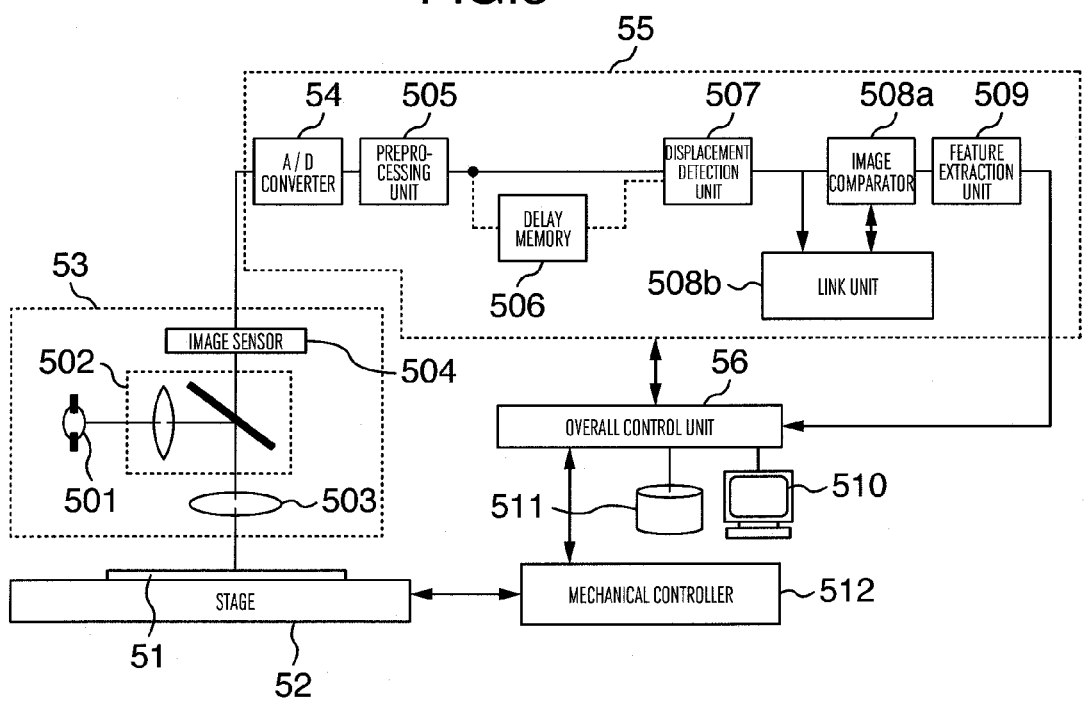
FIG. 5 is a block diagram showing a general configuration of the inspection apparatus.

A fault inspection method for an optical appearance inspection apparatus for a semiconductor wafer is explained as an embodiment. FIG. 5 shows an example of the configuration of the apparatus. Reference numeral 51 designates a specimen (an object to be inspected such as a semiconductor wafer), numeral 52 a stage movable with the specimen 51 mounted thereon, numeral 53 a detection unit configured of a light source 501 for emitting the illumination light radiated on the specimen 51, an illumination optical system 502 for condensing the light emitted from the light source 501 and an image sensor 504 for irradiating the specimen 51, through an objective lens 503, with the illumination light condensed by the illumination optical system 502, focusing the reflected light and the diffracted light again through the objective lens 503 and converting the focused optical image into an image signal in accordance with the brightness. In this embodiment, a two-dimensional image is detected by the continuous feed of the specimen by the stage and a linear image sensor.

Numeral 55 designates an image processing unit for detecting a fault and a fault candidate on the wafer providing the specimen using an image detected by the detection unit 53. The image processing unit 55 includes an A/D converter 54 for converting the input signal from the detection unit 53 into a digital signal, a preprocessing unit 505 for performing the image correction such as the shading correction and the dark level correction using the digital signal, a delay memory 506 for storing a comparative digital signal as a reference image signal (a column of images are stored in the embodiment shown in FIGS. 17 to 20 later), a displacement detection unit 507 for detecting the displacement amount between the digital signal (detected image signal) detected by the detection unit 53 and the reference image signal in the delay memory 506, a link unit 508b for preparing a scattergram by voting or a separated scattergram and linking with the spatial information, an image comparator 508a for calculating the information for correcting the brightness from the separated scattergram using the calculated displacement amount, combining the position and the brightness of the image signal for the detected image and the reference image and outputting the portion larger than a set threshold value as a fault candidate, and a feature extraction unit 509 for narrowing down the fault candidates further using the spatial (positional) information such as the spatial proximity (on the image) between the incoincidences obtained as a fault candidate and calculating the coordinate and the feature amount of the particular fault candidate.

Numeral 56 designates an overall control unit including a user interface unit 510 having a display means and an input means for receiving the change in the inspection parameters (threshold value, etc. used for image comparison) from the user and displaying the detected fault information, a storage unit 511 for storing the feature amount and the image of the detected fault candidate, and a CPU for performing various control operations. Numeral 512 designates a mechanical controller for driving the stage 52 based on a control command from the overall control unit 56. The image processing unit 55 and the detection unit 53 are also driven by the command from the overall control unit 56.

Figure 6:
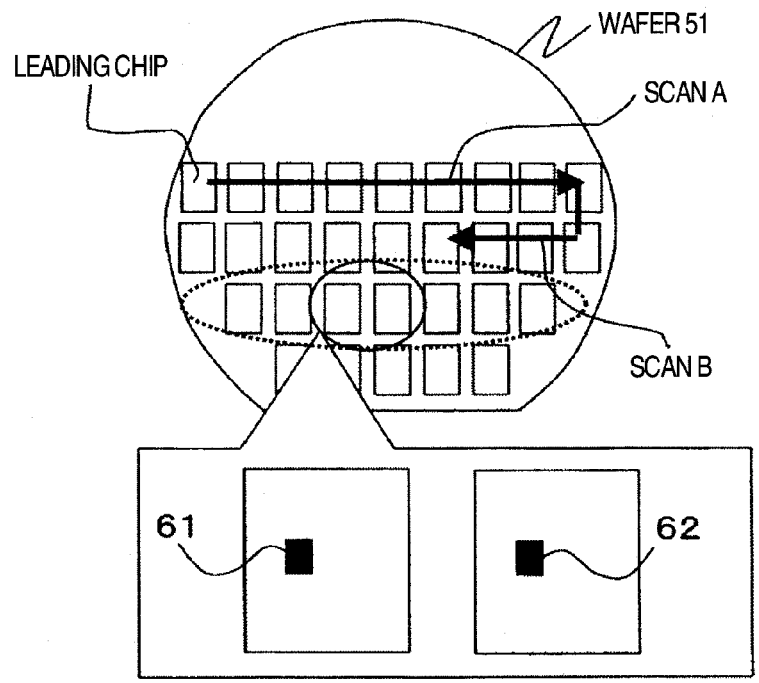
FIG. 6 is a plan view and a partly enlarged view of a semiconductor wafer to be inspected.

The semiconductor wafer 51 to be inspected has a multiplicity of chips assumed to be identical with each other and arranged regularly as shown in FIG. 6. In the inspection apparatus of FIG. 5, the images at the same positions in the adjacent two chips such as areas 61 and 62 in FIG. 6 are compared with each other (in the solid ellipse), and the difference is detected as a fault. More specifically, the overall control unit 56 continuously moves the specimen semiconductor wafer 51 by the stage 52. In synchronism with this movement, the images of the chips are retrieved sequentially by the detection unit 53. The image sensor 504 of the detection unit 53 outputs the input signal to the image processing unit 55.

As the first step in the image processing unit 55, an input analog signal is converted into a digital signal by the A/D converter 54, and the shading correction, the darkness correction, etc. are effected by the preprocessing unit 505. Also, the SN ratio is improved by removing noises or emphasizing edges using a wavelets, as required. The image equality improvement process with an improved SN ratio, however, can also be performed using the difference image. The displacement detection unit 507 is supplied with a set of input signals including the image signal (detected image signal) of the chip to be inspected (hereinafter referred to as the inspection object chip) from the preprocessing unit 505, the image signal input from the delay memory 506 and delayed by the time of stage movement over the chip interval, i.e. the image signal (reference image signal) of the chip immediately preceding to the inspection object chip.

The image signals for the two chips input sequentially in synchronism with the stage movement fail to represent the corresponding portions in the case where the stage is vibrated or the wafer set on the stage is tilted. For this reason, the displacement detection unit 507 calculates the amount of displacement between the two images input continuously. In the process, although the detected image signal and the reference image signal are input continuously, the displacement amount is calculated sequentially for a specified length as a processing unit. It is important to select this length as a value smaller than the period of the vibration, etc. of the stage and the optical system having an effect on the image.

As an alternative, the displacement amount is calculated not for the whole but for a part of the image, and the position thereof may be determined from the image of the leading chip in the scanning operation shown in FIG. 6. Also, in the case where the stage behavior has some degree of reproducibility, the displacement amount determined in the first scan A may be used as a reference to determine the amplitude of the displacement amount calculation in the subsequent scan B. Also, the displacement amount may be determined by matching such as the normalized correlation of the image or may be calculated in frequency domain. The latter case is robust due to the brightness difference and suitable even in the case where the phase alone is taken into consideration.

In view of the fact that the image may be saturated by the illumination conditions for image detection, etc., the process of removing the saturated pixels may be executed at the time of displacement calculation. In this sense, the techniques described in Kensuke Takeda, Shun'ichi Kaneko, Takayuki Tanaka, Kaoru Sakai, Shunji Maeda, Yasuo Nakagawa: Robust Subpixel Image Alignment by Interpolation-based Increment Sign Matching, Proceedings of View 2004 of Workshop on Vision Technique Application, pp. 16-21, 2004" and "Kensuke Takeda, Shun'ichi Kaneko, Takayuki Tanaka, Kaoru Sakai, Shunji Maeda, Yasuo Nakagawa: Robust Subpixel Image Alignment by Interpolation-based Absolute Gradient Matching, Proceedings of the 11th Japan-Korea Joint Workshop on Frontiers of Computer Vision 2005 (FCV2005), pp. 154-159, 2005" may be accompanied effectively by the process such as removing the saturated pixels to eliminate the effects of saturation. Also, a high pattern density may give rise to a beat (aliasing) in repetitive patterns. To avoid this inconvenience, the pixels having the contrast failing to assume a predetermined value may be eliminated.

Each process described below is also executed for each processing unit determined in advance. The image comparator 508a sets the images in position using the displacement amount information calculated by the displacement detection unit 507, and the separated scattergram described later is prepared by the link unit 508b. Based on this information, the detected image and the reference image are compared with each other by the image comparator 508a, and the area with the difference larger than a specified threshold value is output as a fault candidate. In the feature extraction unit 509, small ones of a plurality of fault candidates are eliminated as a noise, or neighboring fault candidates are merged as one fault. Thus, the position, area, size in the wafer and other feature amounts for the real time ADC (automated defect classification) are calculated and output as the final fault. These information are held in the storage unit 511 on the one hand and presented to the user through the user interface unit 510 on the other hand. In this case, the feature amount may represent a feature using the axis or separation of the scattergram, in which case the fault determination and the classification can be realized at a time.

The fault candidates, if determined from the simple difference value by the image comparator 508a, are not necessarily true faults. An example is explained below. In the case where the thickness of the semiconductor wafer 51 is not uniform, the brightness difference develops between the inspection object image and the reference image. In FIGS. 3A, 3B, for example, sets of three crosses 4a, 4b, which are corresponding patterns in the inspection object image 11 and the reference image 12, respectively, have a great brightness difference (hereinafter referred to the brightness variation) due to the thickness difference. Also, only the detected image 11 has faults 1c and 1d.

Figure 1A:
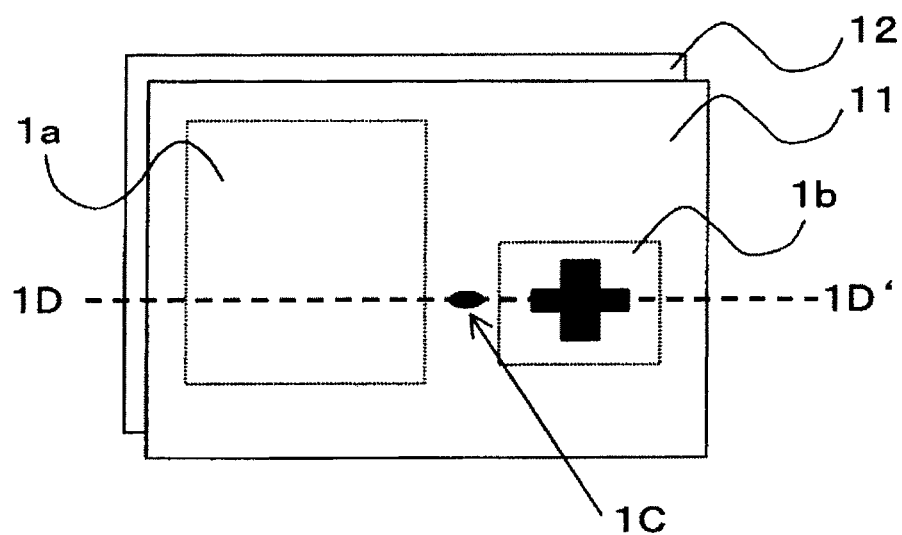
FIG. 1A shows an image of an object to be inspected (hereinafter referred to as the inspection object image).
Figure 1B:
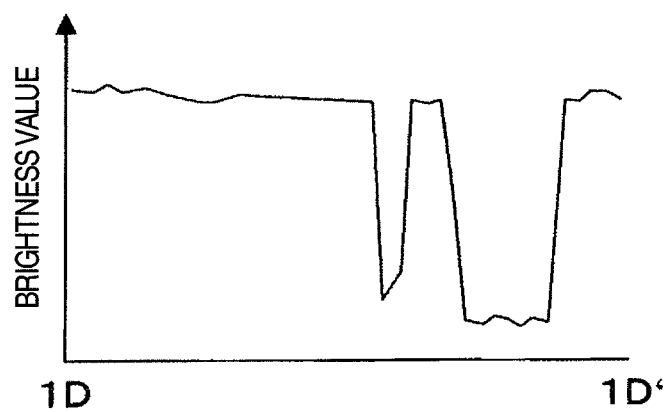
FIG. 1B is a diagram showing a brightness waveform of the image.
Figure 4A:
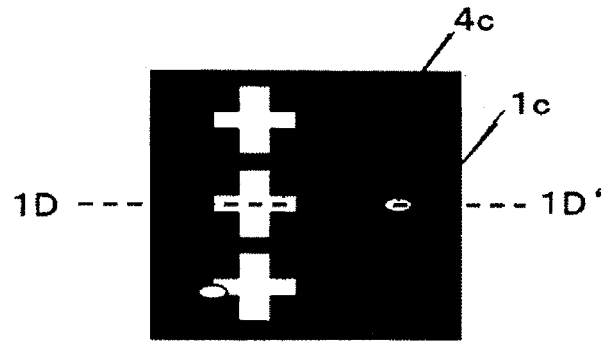
FIG. 4A shows the difference image between the inspection object image 11 and the reference image 12 shown in FIG. 3.
Figure 4B:
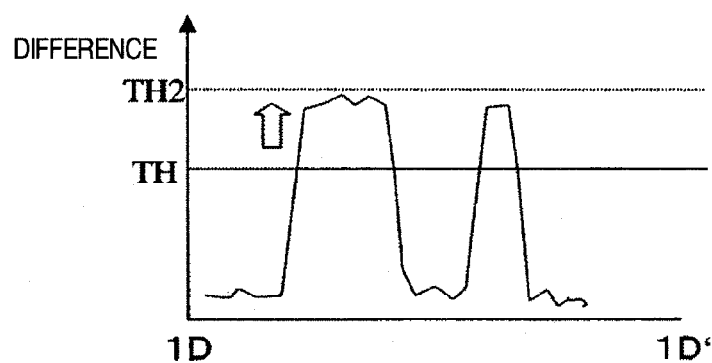
FIG. 4B is a waveform diagram along line 1D-1D" in FIG. 4A.

FIG. 4A shows an image of the difference at each corresponding position in the case where the correct displacement amount of the inspection object image 11 and the reference image 12 shown in FIG. 3, for example, obtained by picking up an image of the areas 61, 62 in FIG. 6 is calculated and set in position in the displacement detection unit 507. Even in the case where the pattern 4a of the inspection object image 11 and the pattern 4b of the reference image 12 are identical with each other, the difference value is increased and a difference image such as the pattern 4c is detected at the portion having the brightness irregularities. FIG. 4B is a waveform taken in line 1D-1D' of the difference image of FIG. 4A. Assuming that an area having the difference value not less than the threshold value TH is a fault, the cross pattern 4c having a large difference value due to the brightness irregularities as well as the fault 1c is detected. These are false information. In order to avoid the detection of the false information due to the brightness irregularities, the threshold value is increased from TH to TH2 to conduct the inspection with a low sensitivity as a whole. As an alternative, the threshold value is set to TH2 for the portion having the brightness irregularities, while the threshold value is set to TH for the portion free of the brightness irregularities. In this way, a plurality of threshold values are conventionally employed for sensitivity adjustment to conduct the inspection.

According to the invention, in contrast, the brightness of the images are combined (brightness correction) before calculating the difference between the detected image and the reference image by the image comparator 508a.

Figure 7:
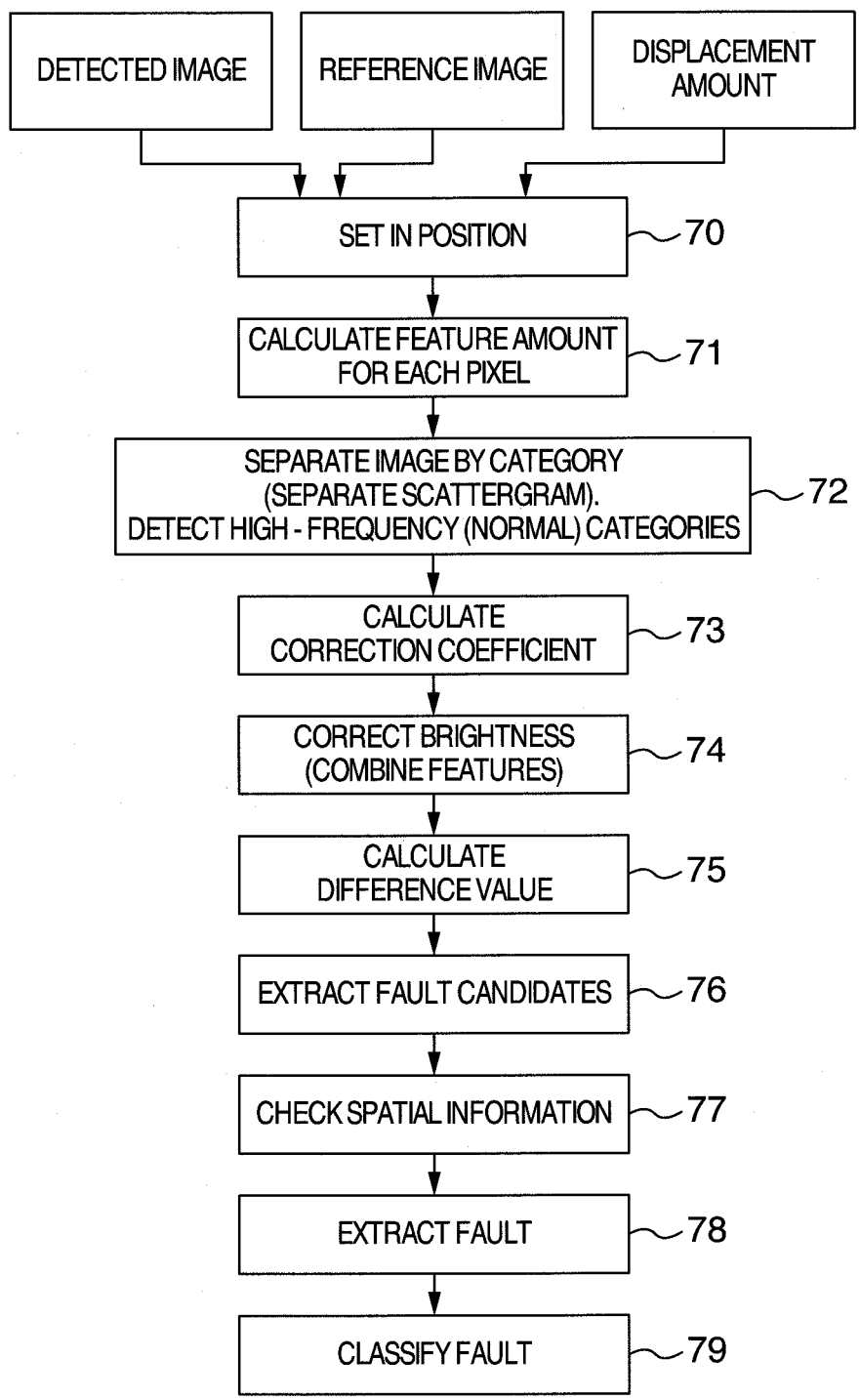
FIG. 7 is a flowchart showing the process flow for combining the brightness of the inspection object image and the reference image and preparing the difference image thereby to extract a fault.

FIG. 7 shows an example of the general process for extracting a fault after brightness combination of images. First, the inspection object image and the reference image are set in position by pixel using the displacement amount calculated by the displacement detection unit 507 (70). The feature amount of each pixel of the image thus set in position is calculated (71), and each pixel of the object image is separated into a plurality of sets in accordance with the feature amount. Specifically, the image is separated by category and a high-frequency category is extracted (72). As a result, a plurality of scattergrams constituting a kind of multidimensional space are created (which may also be considered a section having a multidimensional space). The mass of pixels after separation is hereinafter referred to as a category (or class).

Further, the high-frequency category is detected and regarded as a normal category. Next, the correction coefficient for combining the brightness of the detected image and the reference image by category is calculated by reference to the normal category (73). Using this correction coefficient, the brightness of the images are corrected and combined, by category, in such a manner that the brightness of one image approaches the brightness of the other image (74). As an alternative to the brightness, the feature amount such as the contrast or the brightness difference between corresponding pixels (grayscale difference) may be used as an object of combination. Then, the difference between the corresponding pixels of the detected image and the reference image after correction is calculated (75), and the result of calculation with a difference larger than the threshold value calculated for each pixel is extracted as a fault candidate (76). Finally, the incoincident spatial information is checked (77) thereby to extract a fault (78), while at the same time classifying the fault (79). The fault classification can be conducted on the basis of the scattergram.

As an alternative, the data may be voted into the multidimensional space having a predetermined feature such as the brightness variation between dies or cells of each pixel, and using this voted data, an error value is detected as a fault. The multidimensional space is a scattergram including several predetermined features such as the brightness or contrast between the object pixels and the brightness variations between dies or cells.

Next, an example of the processing steps 71 to 74 for brightness combination is explained in detail. In the case under consideration, the brightness (selected feature) is corrected for the detected image but not the reference image compared. First, the feature amount of each pixel is calculated using the detected image and the reference image set in position by pixel. Among the many feature amounts including the brightness, the contrast, the brightness difference (grayscale difference) between the detected image and the reference image and the feature in frequency domain, an example using the contrast as the feature amount is explained below. First, the contrast is calculated for all the pixels in the object area. Various operators are used for contrast calculation and include a range filter as one of them.

Figure 8:
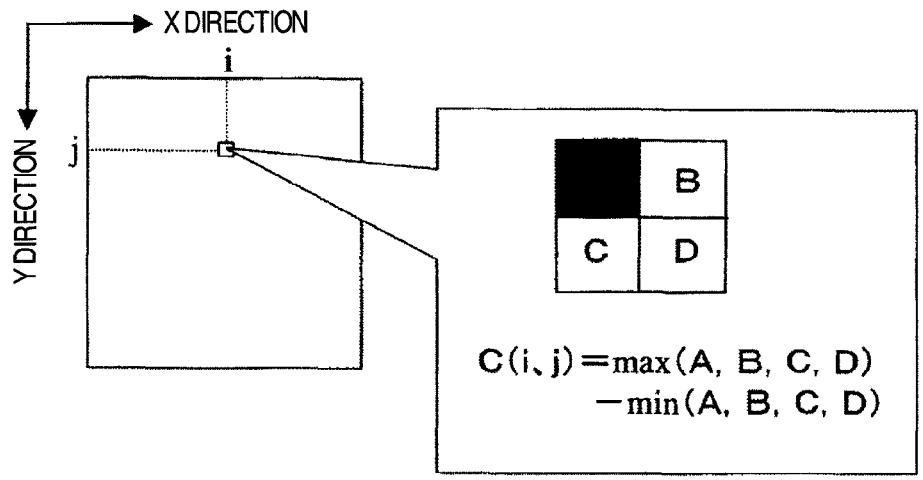
FIG. 8 is a diagram showing an example of the contrast calculation method for an intended pixel with the filter size of 4.

In the range filter, as shown in FIG. 8, the contrast ($C(i, j)$) at the coordinate position (i, j) in the object area is regarded as the difference between maximum and minimum values of brightness in the neighboring areas. In the case where the filter size is 2.times.2, assume that the brightness at (i, j) is A and the brightness in the neighboring areas B, C, D. The formula for determining the contrast ($C(i, j)$) is given by Equation 1. The size can of course be set appropriately or, for example, at 3.times.3 in accordance with the object.

$$C(i,j)=\text{Max}(A,B,C,D)-\text{Min}(A,B,C,D) \quad (1)$$

Also, the percentile filter for reducing the effect of noises may be used instead of the range filter in accordance with the image quality.

Figure 9:
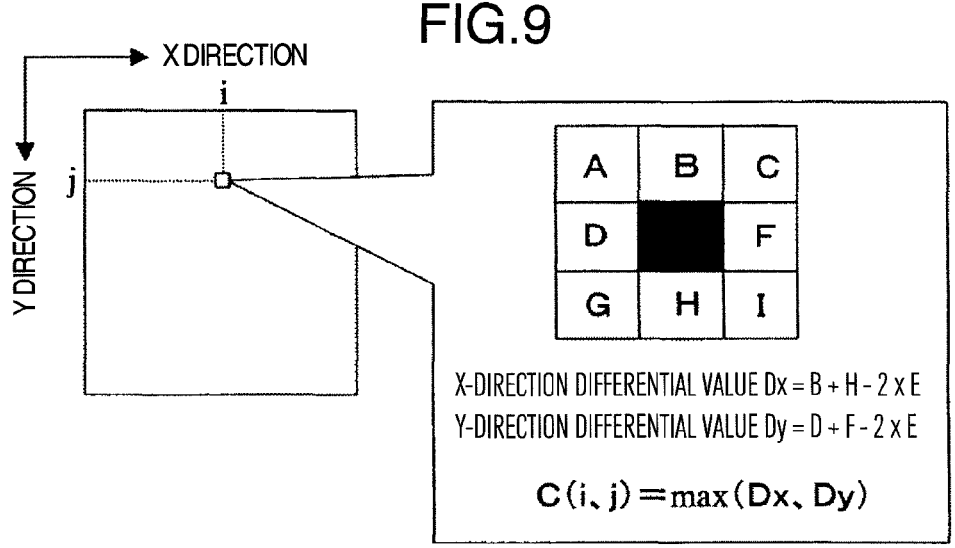
FIG. 9 is a diagram showing an example of the contrast calculation method for an intended pixel with the filter size of 9.

Also, the contrast at the coordinate (i, j) in the object area can be calculated by the secondary differential value. In this case, as shown in FIG. 9, the calculation is made according to Equation (2) using the brightness A to I in the 8 adjacent pixels to determine the X differential value Dx and the Y differential value Dy.

$$Dx=B+H-2.\text{times}.E\ Dy=D+F-2.\text{times}.E\ C(i,j)=\text{Max}(Dx,Dy) \quad (2)$$

Various other calculation methods can be used to determine the brightness change amount in the neighbors. In this way, the contrast Fc(i, j) for each pixel of the detected image and the contrast Gc(i, j) for each pixel of the reference image are calculated. Then, the contrasts of the two images are integrated by determining an average of the corresponding pixels of the detected image and the reference image (Equation (3)), by determining the difference between the two images (Equation (4)) or by employing the larger one (Equation (5)) thereby to uniquely determine the contrast for each pixel. In accordance with the contrast value C(i, j), the image is separated into several stages. The result of separation into several stages is hereinafter referred to as the contrast categories. Consequently, the image is separated into several stages including a portion having uniform brightness such as area 1a (low contrast area) and a portion such as the pattern edge of the area 1b where the brightness sharply changes (high contrast area).

$$C(i,j)=(Fc(i,j)+Gc(i,j))/2 \quad (3)$$

$$C(i,j)=|Fc(i,j)-Gc(i,j)| \quad (4)$$

$$C(i,j)=\mathrm{Max}(Fc(i,j),Gc(i,j)) \quad (5)$$

Figure 10:
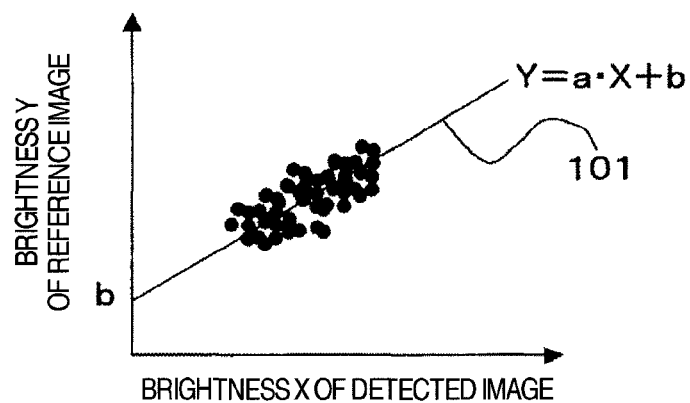
FIG. 10 is a scattergram of the brightness of the inspection object image and the reference image.

Next, the correction coefficient for combining the brightness (selected feature) is calculated for each contrast category. An example is explained with reference to FIG. 10. First, a scattergram is prepared for the pixels of the same contrast category with the abscissa (X) representing the brightness of the detected image (selected feature) and the ordinate (Y) representing the brightness of the corresponding reference image (selected feature), and the linear approximation is determined from the scattergram.

The category with a small frequency is liable to be a fault, and therefore replaced with a high-frequency normal category. The linear approximation is effected using the neighboring normal category data or the data including the intended category and the neighboring normal category using the nearest neighbor method. In Fig. the relation 10, 101: Y=a X+b represents a linear approximation determined from the scattergram of the pixels associated with a certain contrast category. Various methods are available for calculating the linear approximation. An example is the least square approximation (the method of determining a straight line minimizing the total distance from the points). The inclination a of the approximation line calculated and the Y segment b constitute the correction coefficient of the particular contrast category.

The brightness (selected feature) of the detected image is corrected using the correction coefficient thus calculated and the brightness (selected feature) is combined. Actually, assuming that the brightness of the detected image is F(i, j), the detected image F'(i, j) after correction is calculated from the inclination a of the approximation line and the Y segment b (Equation (6)). The difference between the brightness F'(i, j) after correction of the detected image and the brightness G(i, j) of the reference image (Equation (7)) is determined as a difference D(i, j), so that the portion larger than the threshold value TH set by the difference is regarded as a fault candidate.

$$F'(i,j)=a.\mathrm{times}.F(i,j)+b \quad (6)$$

$$D(i,j)=F'(i,j)-G(i,j) \quad (7)$$

The correction of the brightness (selected feature) of the detected image is equivalent to the rotation (rotation amount in gain) and shifting (shift amount in offset) of the brightness (selected feature amount) of each pixel within the scattergram to place the scattergram on a straight line of the Y segment 0 tilted at 45 degrees.

Figure 15A:
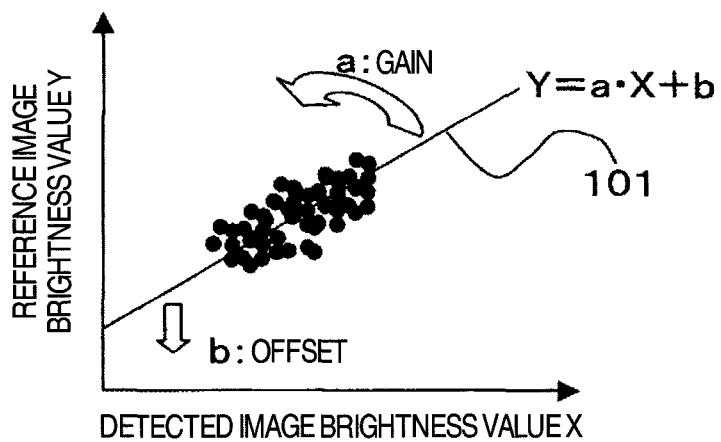
FIG. 15A is a scattergram showing the inspection object image and the reference image with the brightness value as a feature amount.
Figure 15B:
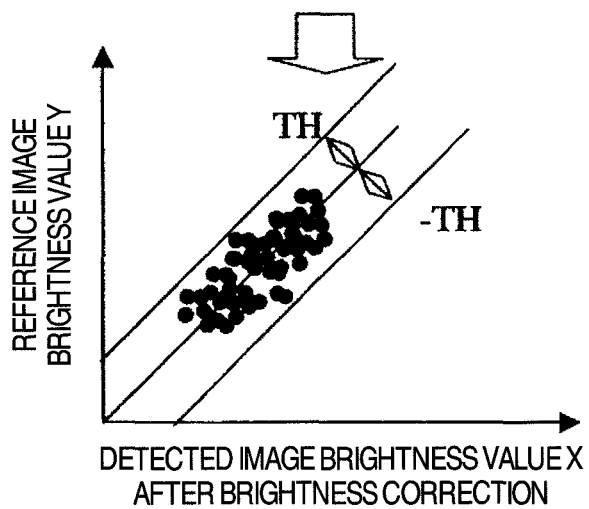
FIG. 15B is a diagram showing the brightness value of each pixel rotated and shifted within the scattergram.
Figure 15C:
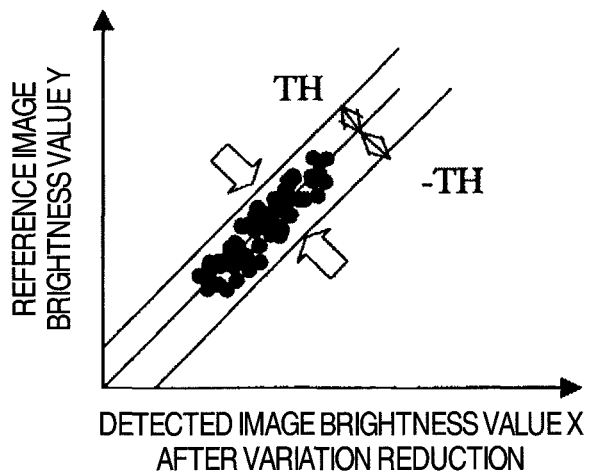
FIG. 15C is a diagram showing a state in which the data spread is reduced on the scattergram.

This operation is shown in FIGS. 15A to 15C. The difference value D(i, j) is equivalent to the distance from the straight line after conversion. This indicates that the smaller the distance to the straight line, the smaller the difference value after correction. FIG. 15A shows an example of the scattergram of the reference image and the detected image prepared with the brightness (brightness value) as a feature amount. FIG. 15B, on the other hand, is a scattergram after the brightness correction of the detected image so that the inclination of the approximation line on the scattergram is 45 degrees and the y segment is 0. The threshold value TH for fault detection is set outside the scattergram after conversion. In order to make the inspection with high sensitivity by setting a low threshold value TH, therefore, the spread of the data on the scattergram after brightness correction is required to be slimmed. The feature is selected, therefore, in such a manner as to minimize (with minimum variance, for example) the data spread (variation) on the scattergram. FIG. 15C shows an example of the result of reducing the data spread (variation) on the scattergram after brightness correction.

Figure 11:
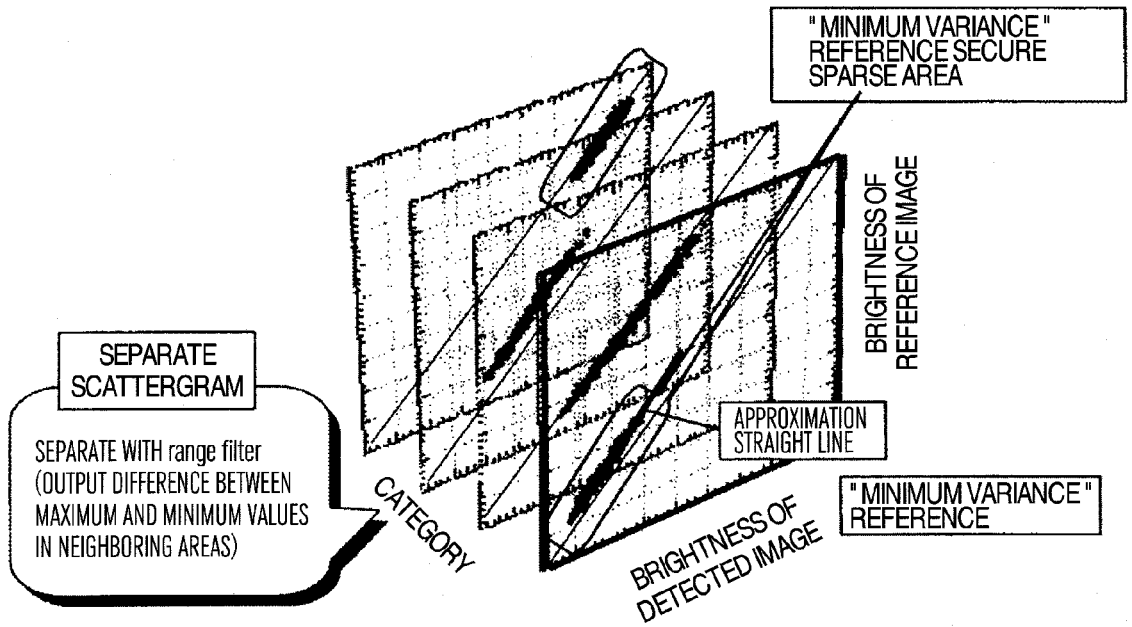
FIG. 11 is a diagram in which a plurality of scattergrams prepared by separating the brightness scattergram of the inspection object image and the reference image based on the contrast of the edge portion are equidistantly arranged and displayed in superposition.

The reason why the variation of the scattergram can be reduced by the method described with reference to FIG. 7 is explained below. In a LSI wafer, the thickness changes not only in the flat portion but also in the edge portion of the pattern. In the bright field detection, the greater part of the light regularly reflected on the edge portion fails to reach the image sensor. What is observed is mainly the diffracted light. At the edge portion, therefore, the thickness change has a smaller effect than at the flat portion. Even in comparing two chips adjacent on the wafer, therefore, the incoincidence due to the thickness change has a smaller effect on the edge portion. As shown in FIG. 11, therefore, a scattergram having a smaller variation is obtained at the edge portion by separating the scattergrams of two images (detected image and reference image) on the basis of the contrast at the edge portion. By appropriately setting the threshold value, therefore, the fault at the edge portion, i.e. a fine geometric fault of the pattern can also be detected. The threshold value may assume two values, positive and negative, or an envelope (polygonal line, etc.) containing the scattergram data. Also, the comparison of still higher sensitivity is achieved by gradation conversion based on Equation (6).

By selecting the feature mainly with respect to the behavior of the diffracted light as described above, the contrast constitutes one of the major feature candidates in the bright field detection. The contrast may be classified into different categories divided at equal or unequal intervals. In FIG. 7, each pixel of the image is separated into the contrast categories. This indicates that as many scattergrams as the contrast categories are prepared as shown in FIG. 11.

In the actual apparatus, the type of the contrast calculation filter, the filter size, the number of divisions into the contrast categories and the interval or the like can be changed flexibly by definition on a lookup table.

The scattergram can be separated with high separability with suppressed spread by using the layer information based on the CAD data having equivalent edge information instead of the contrast of the pattern edge. In this case, the area where layers are superposed should better be regarded as another layer. This concept, unlike the main composition analysis, is not to reduce the feature by axis selection, but a similar concept is applicable.

The same concept is applicable to the DUV light and the VUV light mainly using the laser light source for the coaxial epi-illumination and the bright field detection through an objective lens as disclosed in Patent Document 2.

In the bright field detection, the light scattered from the flat portion is not detected and comparatively stable, while the brightness changes considerably due to the delicate geometric difference at the pattern edge portion, with the result that the scattergram has large variations at the high contrast portion. The point is, therefore, how to mask and reduce the scattered light from the pattern edge by the Fourier transform surface of the specimen. For this purpose, a masking filter called "the spatial filter" corresponding to the object pattern frequency is inserted in the light path to reduce the scattered light from the pattern. Also, the scattered light can be effectively removed from the pattern edge by detecting it diagonally but not in the upper part. As a result, the data spread on the scattergram can be reduced. The scattergram can be used, therefore, for evaluating the geometric adaptability and setting the angle and direction for diagonal detection of the spatial filter for the object pattern.

Various feature amounts, including the contrast difference, the grayscale difference, the brightness (information), the texture information and the frequency information on the scattergram, can be used in accordance with the object and the detection method for correctly separating the scattergram using a criterion such as the variance minimization. In any case, as long as a sparse area free of data can be secured on the scattergram, a fault mapped to the particular area can be detected for an improved inspection sensitivity. In other words, the feature is selected in such a manner as to secure the sparse area. The sparse area is defined as a category having the frequency not more than a predetermined threshold value. The more the categories, the higher the fault detection sensitivity.

Now, another example using the frequency (number of pixels) is explained. As a general feature, the frequency of the color irregularities (normal area) is high due to the facts extended over a wide range, such as (a) the repetitive generation and (b) the generation over the whole of a given pattern. The normal portions are of course high in frequency as they are concentrated on the scattergram. Defects (abnormal area), on the other hand, are low in frequency. Even a large fault often spreads on the scattergram and the frequency for each category is low. Taking advantage of this fact, faults and color irregularities are discriminated from each other. In the case under consideration, a category with the frequency not lower than a predetermined threshold value is searched for in the feature space and regarded as normal. The distance from the normal category is added to the incoincidence information or the value thereof output. This distance may be either the Euclidean distance or the Mahalanobis distance normalized by the covariance matrix.

Figure 12A:
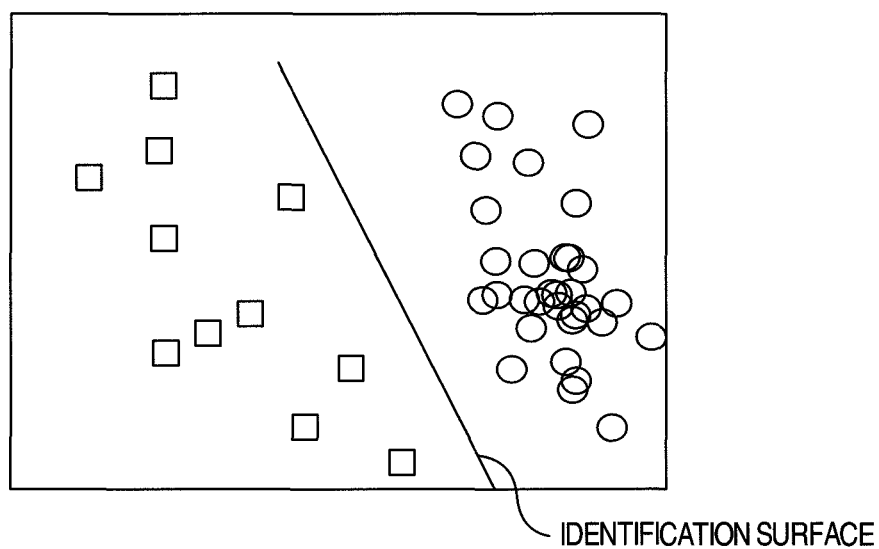
FIG. 12A is a diagram showing the feature space indicating an example of determining the identification surface for classifying the categories in the feature space using the training data.
Figure 12B:
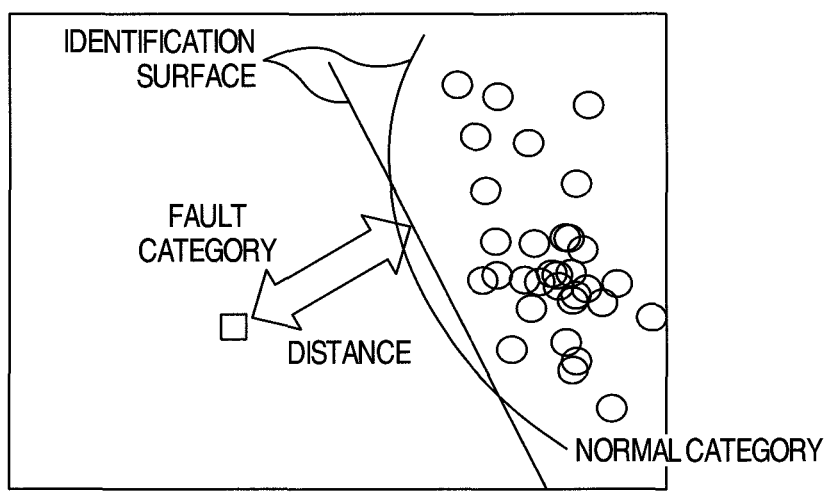
FIG. 12B is a feature space diagram showing an example of determining the identification surface for classifying the categories including the normal category in the feature space using the training data and expressing the fault data as a distance from the normal category.

Normally, in the field of pattern recognition, as shown in FIG. 12A, the discrimination plane (hyperplane) for separating different categories (also called classes) taking the Bayes decision rule for minimum error in the feature space into consideration is determined from the training data. According to this embodiment, on the other hand, as shown in FIG. 12B, only the normal category (the data on the right side in FIG. 12B) is correctly determined by the training data in the feature space, while the fault category (the data on the left side in FIG. 12B) can be expressed as the distance from the normal category. The user can obtain the desired result by binarizing this distance. Depending on the threshold value, the overlooking is logically avoided (false information is liable to occur but can be controlled by the threshold value). The plane for identifying the normal category may be either a straight line or a curved line (including a polygonal approximation). In the case under consideration, the normal pattern limit is given as frequency data, and in the case of the linear identifier, the learning is made by the weight and bias thereof. Incidentally, the normal range may be stored as the scattergram in the data table, and comparison is made with this data table.

An example is explained above in which the scattergram (image) is separated by contrast and thus slimmed. As an alternative, the scattergram (image) may be separated by the brightness of the detected image or the reference image, the color information, the texture information, the statistical amount such as the brightness variance or the feature in frequency domain. In short, according to the invention, the image is separated for each area having the same feature thereby to slim the scattergram. Also, these features or the calculation result (the brightness difference, for example, in the case of the amount of the feature as brightness) may be selected as the axis of the scattergram.

Figure 13A:
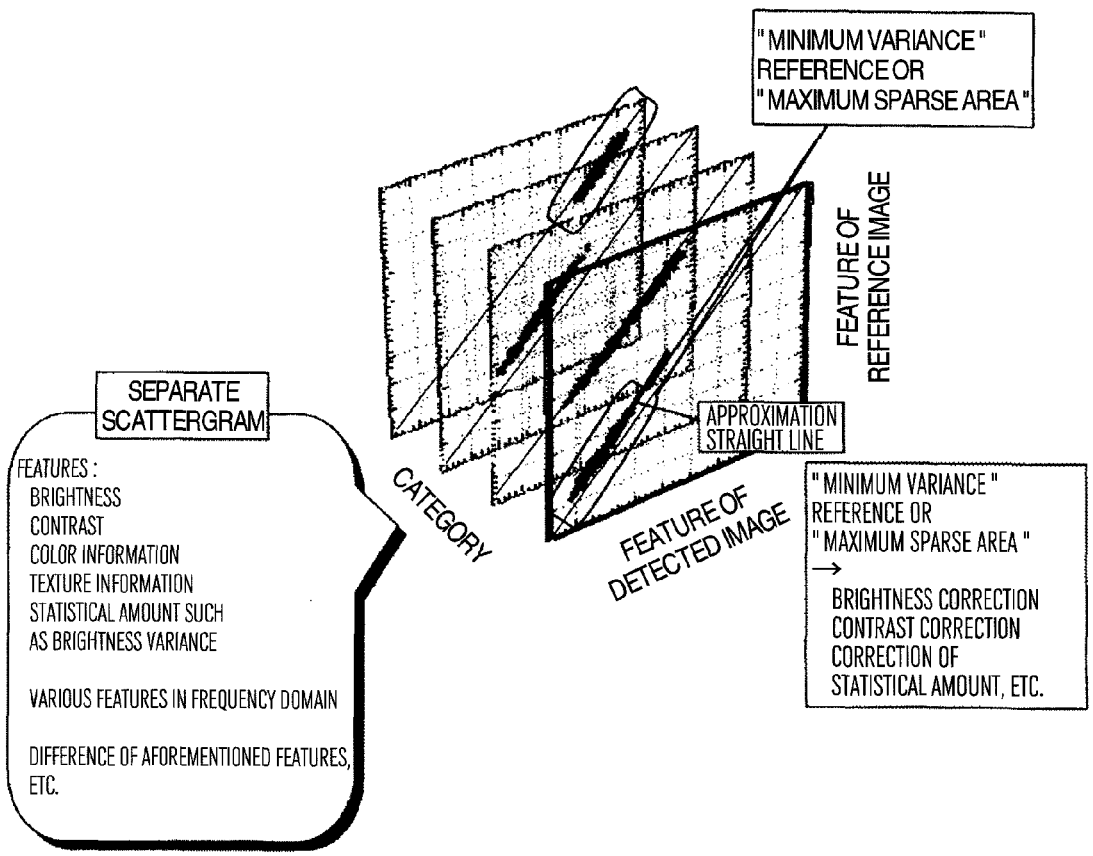
FIG. 13A is a diagram showing a case in which the scattergram of the inspection object image and the reference image is prepared and separated with a preselected feature amount.

Specifically, as shown in FIG. 13A, a scattergram with a feature selected as an axis in advance is prepared, and the object feature is combined. In this way, the high-sensitivity inspection is made possible without being affected by the incoincidence of the normal portion, while at the same time reducing the generation of the false information. The feature constitutes the object of comparison. In the case where the feature is the brightness, the brightness is corrected, while in the case where the feature is the contrast, the contrast is corrected. This is also the case with other features.

Figure 13B:
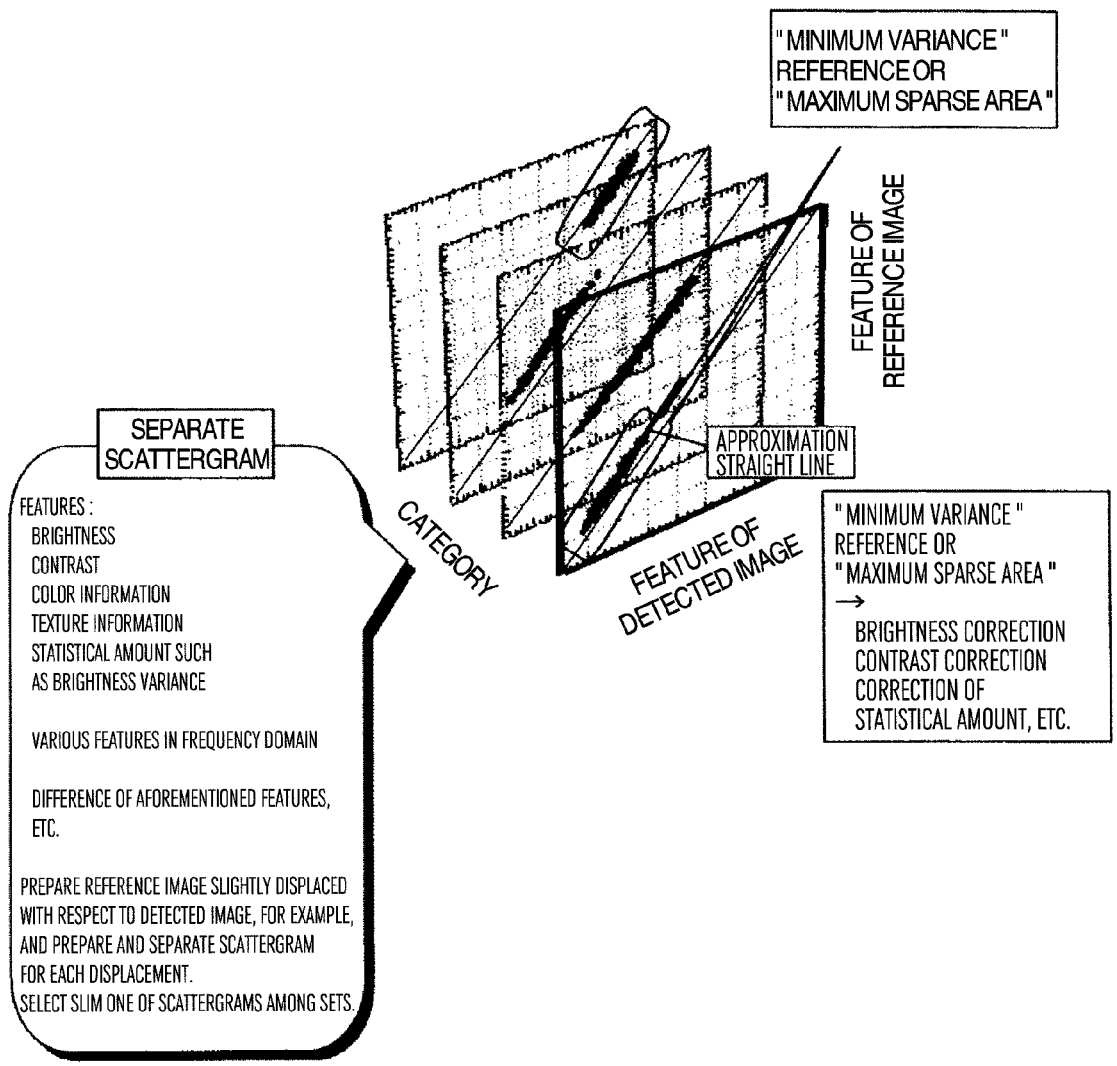
FIG. 13B is a scattergram showing a case in which the position of the reference image is displaced slightly from the inspection object image.

As shown in FIG. 13B, on the other hand, a plurality of reference images displaced by a slight interval of 0.1 pixel, for example, in X and Y directions are prepared by such a technique as interpolation, and a scattergram is prepared with each detected image and separated so that the data spread is slimmed. Then, the image pair set in position is automatically selected, i.e. can be set in position at the same time. The faults can also be classified by the pattern discrimination method such as the IF-THEN rule, fuzzy voting, NN method (k-NN method) using the aforementioned features. In this way, the image positioning, the fault determination and the fault classification can be realized at a time.

Further, the preparation or separation of the scattergram constituting one of the multidimensional spaces results in storing the detected image with a remarkably reduced capacity and makes a suitable image data compression method. Further, this technique is effective in the sense that the speed is effectively improved thereby to prevent the explosion of the ever increasing size of the image processing hardware with the functions thereof complicated more than ever before. In the scattergram, the data capacity is reduced by eliminating the spatial information, which is minimized by selecting the features.

Apart from the aforementioned example of separating the image by one feature amount and combining the brightness, the scattergram may alternatively be slimmed based on three or more feature amounts. In this case, the separated scattergram has multidimensional axes. For example, the scattergram has two axes of brightness, which can be further separated into four dimensions with the contrast and brightness as axes. The process according to this embodiment is executed within this four-dimensional box.

Figure 13C:
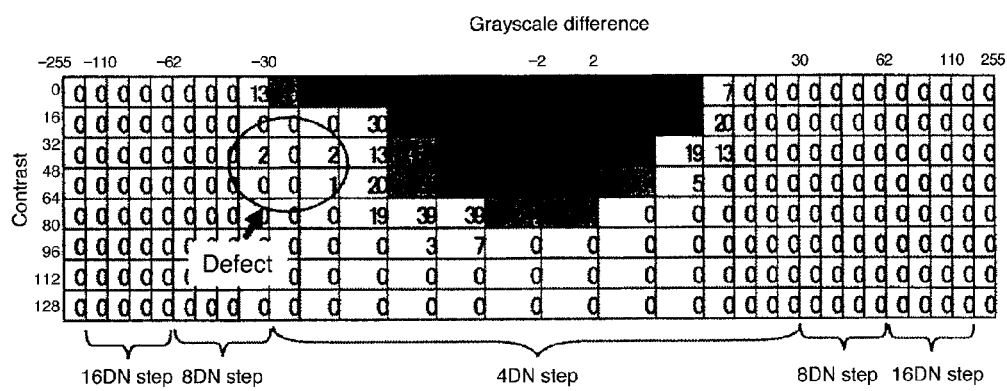
FIG. 13C is a category map showing an example of separating the scattergram by contrast with regard to the pixels with the brightness included in a set gradation range.

FIG. 13C shows an example (category map) with the scattergram separated by contrast for the pixels having the brightness thereof included in the set gradation range. The ordinate represents the contrast divided into categories, and the abscissa the brightness difference divided into categories. This diagram also shows the frequency expressed for each category. The contrast in this case is derived from Equation (4). In accordance with the brightness category, a plurality of category maps are prepared. Naturally, the features other than the brightness may be combined.

Next, the preparation of the separated scattergram and the linking portion 508b for the spatial information according to an embodiment are explained.

The incoincidence, which is output by the image comparator 508a due to the separation of the scattergram and which is larger than the predetermined threshold value, is finally output as a fault on the scattergram. A given fault tends to be scattered instead of being concentrated at a point on the scattergram. This is by reason of the fact that the position in the feature space is determined by the fault and the background pattern thereof (the position on the reference image corresponding to the fault), and the detect is not always concentrated on the scattergram.

A fault 1c shown in FIG. 3, for example, has a uniform background, and therefore, is concentrated at a point on the scattergram. A fault 1d, if any, on the edge of the pattern 4a, however, covers both the uniform and edge portions, and therefore, is scattered on at least two separated scattergrams. The incoincidence information scattered on the scattergram, therefore, corresponds to the spatial (on-image) proximity (distance). or in the case of the fault 1d, to the position thereof on the image. By checking the spatial distance of the particular point, therefore, the fault identity can be determined, thereby making it possible to evaluate the degree of defectiveness with a higher reliability.

In spite of the determination as an incoincidence, the determination as normal is possible as long as certain spatial conditions such as the brightness assuming a local maximum value are met. Also, a fault can be determined according to an amount of the order statistic in the neighboring area (such as the value obtained by multiplying max-min by the order of magnitude in the pixels 3.times.3). In this way, a fault candidate can be determined according to the order statistic in the local space. In any case, a fault or non-fault is determined by checking both the scattergram information and the spatial information on the image (77, 78 in FIG. 7).

As described above, in the inspection for comparing two images and detecting a fault from the difference value according to this invention, the comparison is made by the separation of the scattergram or the brightness is combined.

Figure 14A:
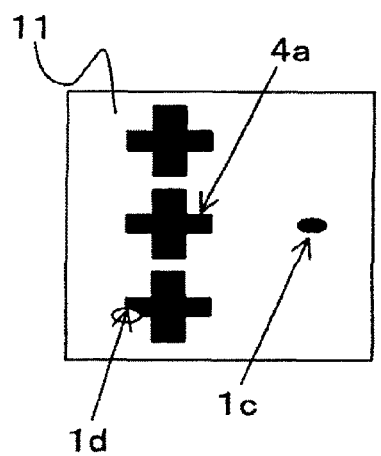
FIG. 14A shows an inspection object image.
Figure 14B:
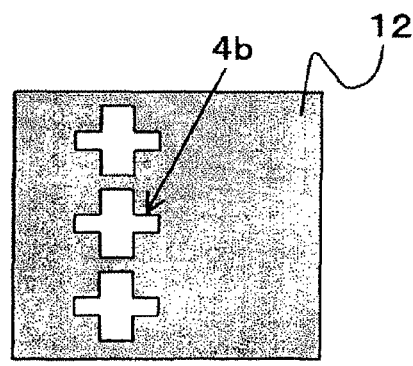
FIG. 14B shows a reference image.
Figure 14C:
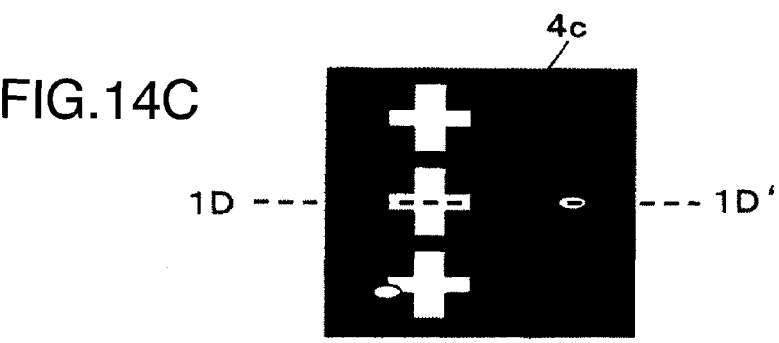
FIG. 14C shows the difference image between the inspection object image in FIG. 14A and the reference image in FIG. 14B.
Figure 14D:
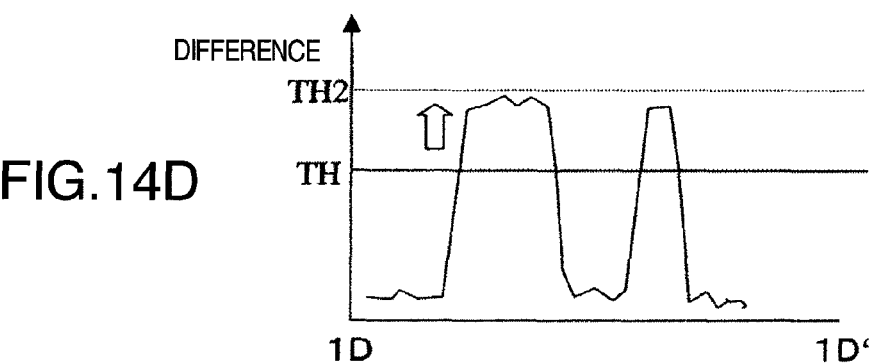
FIG. 14D shows a signal waveform along line 1D-1D' in the difference image of FIG. 14C.
Figure 14E:
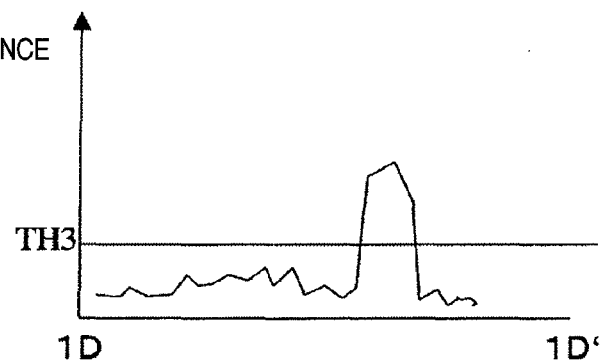
FIG. 14E is a diagram showing a signal waveform along line 1D-1D' of the difference image after combining the brightness of the inspection object image in FIG. 14A and the reference image in FIG. 14B.

FIG. 14A shows an inspection object image, FIG. 14B a reference image, and FIG. 14C a difference image between the inspection object image and the reference image. The signal waveform taken in line 1D-1D' of the difference image shown in FIG. 14C assumes the form as shown in FIG. 14D. The brightness of the inspection object image shown in FIG. 14A and the reference image shown in FIG. 14B are combined and the signal waveform shown in FIG. 14E is obtained as taken in line 1D-1D' of the difference image. The brightness combination reduces the difference value. In the prior art, therefore, the threshold value is set to TH2 for the whole area, or two threshold values TH and TH2 are set to avoid the generation of false information. By combining the brightness as in this invention, however, the generation of the false information caused by the brightness irregularities can be prevented without adversely affecting the sensitivity. Also, the high-sensitivity inspection and easy sensitivity adjustment are made possible with a single low threshold value TH3. Further, according to the invention, there is provided an optical appearance inspection apparatus of visible light type having the detection sensitivity of 50 nm as compared with the normal figure of 100 nm. Experiments have confirmed that a fault as small as one third of the detected pixel size can be detected.

Figure 16:
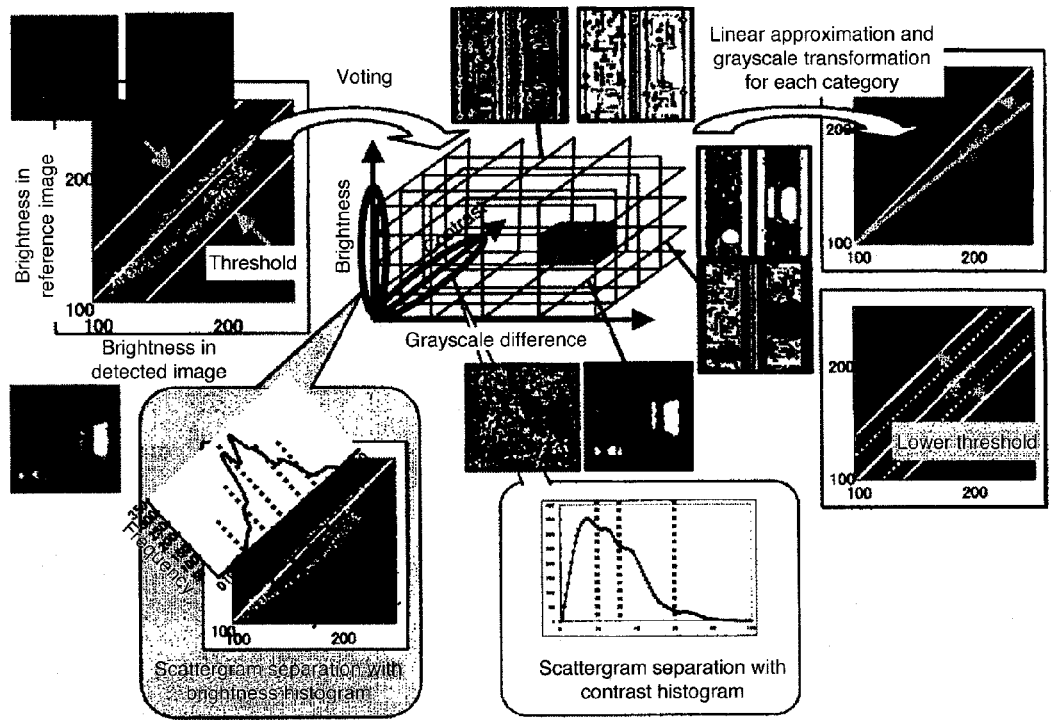
FIG. 16 is a diagram showing an example of separating the scattergram with brightness, contrast and difference as feature amounts.

Let us add to the explanation about the category division. FIG. 16 shows an example of the scattergrams separated by contrast, grayscale difference and brightness, and how the category division (interval) is set. The axis on that side represents the category division by contrast, and the axis on this side the category division by grayscale difference. The ordinate represents the division by brightness. Each small box divided provides the category base indicating the frequency for each category. In accordance with each brightness category, a plurality of category maps shown in FIG. 13C are prepared.

The brightness division (intervals) is carried out based on the local minimum value or the shape of a histogram of image brightness. The brightness is divided into a maximum of eight brightness categories taking, for example, the number of layers of a multilayer pattern into consideration. The division interval is determined, however, in such a manner that the total of the pixel frequencies associated with each brightness category satisfies a predetermined value. The contrast is divided in similar fashion. In the case of contrast, the shape of the histogram is gentle and division points are not clear. After the frequency on the ordinate of the histogram is displayed logarithmically, therefore, the division interval is determined by taking a local minimum value.

Next, another example of the scattergram separation is explained. In the examples thus far explained, two images such as those in areas 61, 62 (in the solid ellipse) shown in FIG. 6 are compared as a prerequisite. Actually, however, a plurality of die images are detected and can be used. The use of a plurality of dies makes it possible to take into consideration the manner in which the brightness of each corresponding pixel undergoes a change. Especially, a row of images are stored (in the dashed ellipse in FIG. 6) and can be used to compare the images of areas 61, 62.

Figure 17A:
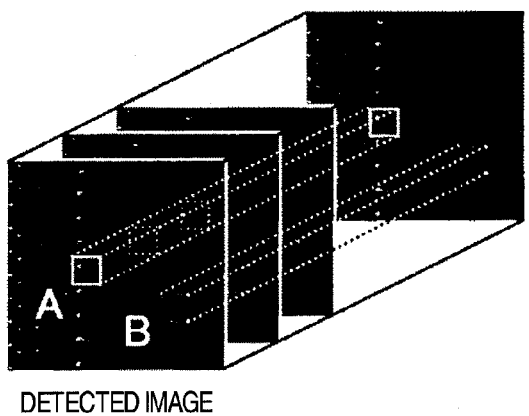
FIG. 17A is a diagram showing the brightness distribution diagrams at corresponding points of a plurality of dies, displayed in superposition.
Figure 17B:
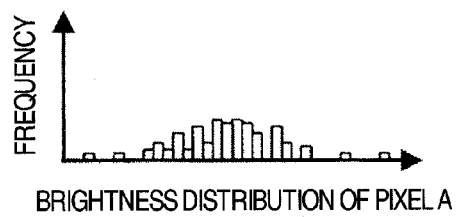
FIG. 17B a graph showing the brightness distribution of the pixel A over a plurality of dies.
Figure 17C:
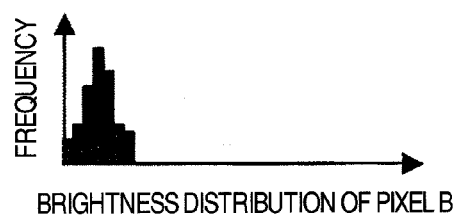
FIG. 17C a graph showing the brightness distribution of the pixel B over a plurality of dies.

FIG. 17A is a diagram showing, in superposition, the brightness distribution diagrams at corresponding points over a plurality of dies, FIG. 17B a graph showing the brightness distribution of the pixel A over a plurality of the dies, and FIG. 17C a graph showing the brightness distribution of the pixel B over a plurality of the dies. In the absence of variations in the circuit pattern, the same image should be detected from each of the dies shown in FIG. 17A. Actually, however, the thickness of the wiring is varied to the extent not constituting a fault. Also, under the effect of sampling at the time of image detection, as shown in FIGS. 17B, 17C, the brightness distribution is expanded. The difference of the pattern thickness is also greatly varied. In the case where the thickness difference is the main factor, the expansion of the brightness distribution has the pattern dependency as shown in FIGS. 17B, 17C.

Figure 18A:
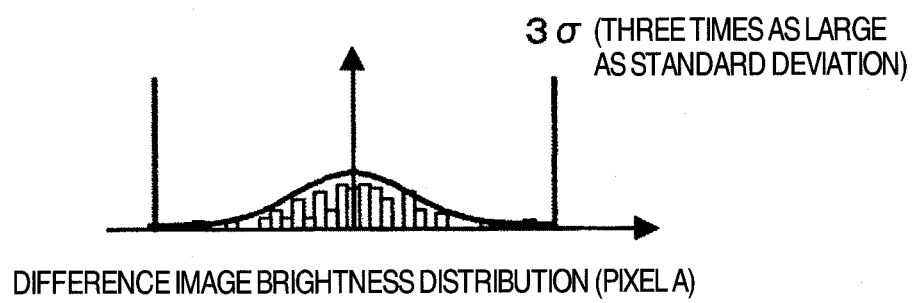
FIG. 18A is a diagram showing an example of separating the scattergram by the variations (3a) of the brightness distribution of the pixel A over a plurality of dies.
Figure 18B:
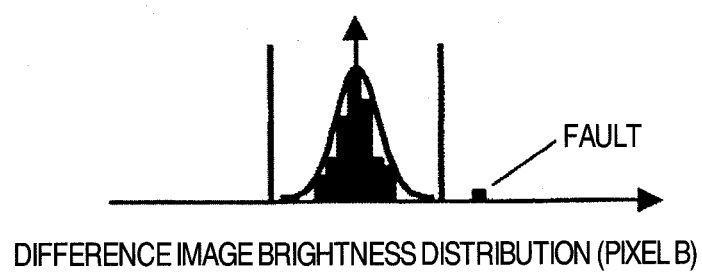
FIG. 18B is a diagram showing an example of separating the scattergram by the variations (3.sigma.) of the brightness distribution of the pixel B over a plurality of dies.

Assuming that the brightness distribution of the corresponding points between the dies is the normal distribution, for example, as shown in FIGS. 18A, 18B, a deviation from the particular distribution can be detected as a fault. This variation from one pixel to another can be regarded as a feature amount. More specifically, the scattergram including several features such as the brightness or contrast of the object pixel or the brightness variation between dies or cells is separated by other features, and a fault is detected using a plurality of scattergrams thus separated.

FIGS. 19A to 19D show a general configuration. First, the following steps are taken.

Figure 19A:
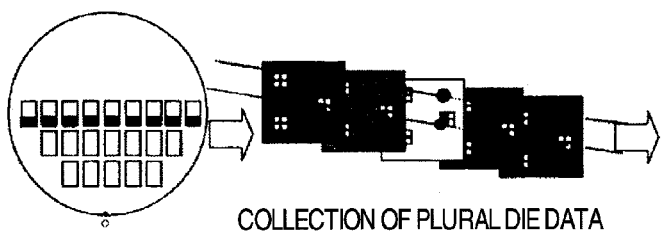
FIG. 19A is a diagram showing, as an image, the collection of the data held by calculating the difference image of adjacent dies over a plurality of dies.

(1) The difference image between adjacent ones of a plurality of dies is calculated and held (FIG. 19A).

Figure 19B:
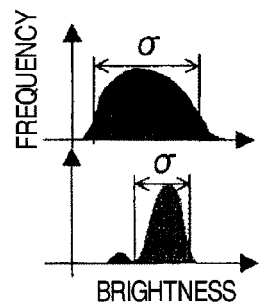
FIG. 19B is a graph showing the relation between the average value p and the standard deviation .sigma. for each corresponding point.

(2) The average value .mu. and the standard deviation .sigma. are determined for each corresponding point (FIG. 19B).

Figure 19C:
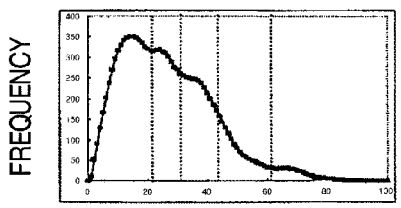
FIG. 19C is a graph showing a histogram of the standard deviation of each pixel in the image.

(3) The standard deviation of each pixel is formed into a histogram in the image (FIG. 19C).

Figure 19D:
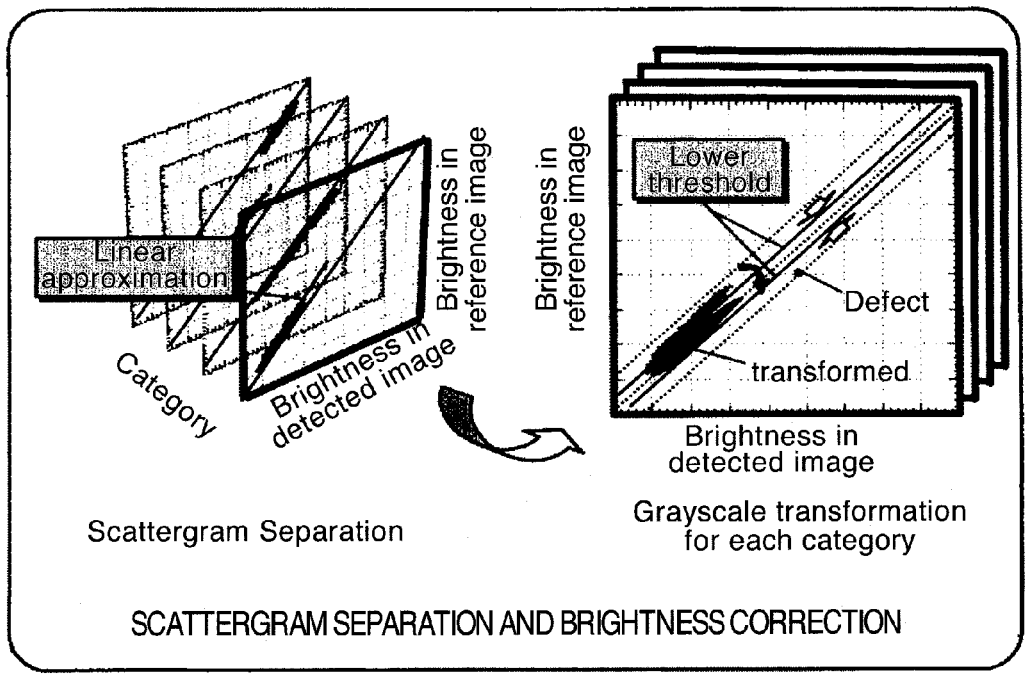
FIG. 19D is a diagram showing a state in which the scattergram is separated by category and thus by correcting the brightness, the data spread on the scattergram is reduced.

(4) The histogram is automatically divided into several categories as in FIG. 16, and a separated scattergram prepared. Then, the brightness is corrected and the scattergram slimmed (FIG. 19D).

The category division corresponds to the image segmentation, in which the area is divided in accordance with the variation magnitude, and the brightness is combined for each area. Especially, this operation is performed based on the pixel as a unit, and may be carried out not for dies but cells constituting a repetitive pattern in the dies.

This division by variation has the feature that the areas are separated from each other into patterns having a large variation and those having no large variation. In each scattergram thereof, the brightness is corrected thereby to recognize a fault. Even in the case where a given pattern has a different thickness between dies, and the brightness is greatly varied from one die to another, the surrounding patterns are advantageously not affected.

The ordinary segmentation is to divide the pattern into areas and a high accuracy requires a high skill. According to this embodiment, on the other hand, taking the brightness variation rather than the two-dimensional information of the pattern into consideration, the division meeting the purpose is made possible with greater ease. Incidentally, the standard deviation .sigma., which can be determined by a parametric method, may alternatively be determined by calculating the histogram as a statistical value indicating the width thereof such as the range or the inter-quartile range. These statistical values may be changed in collaboration with the threshold value to change the sensitivity. Apart from the foregoing case taking the brightness variation between dies or cells into consideration, the variation of other than brightness may alternatively be employed. For example, the contrast variation between dies or cells may alternatively be used. The variation of a possible feature amount for each pixel is still another alternative which may be employed.

Figure 20:
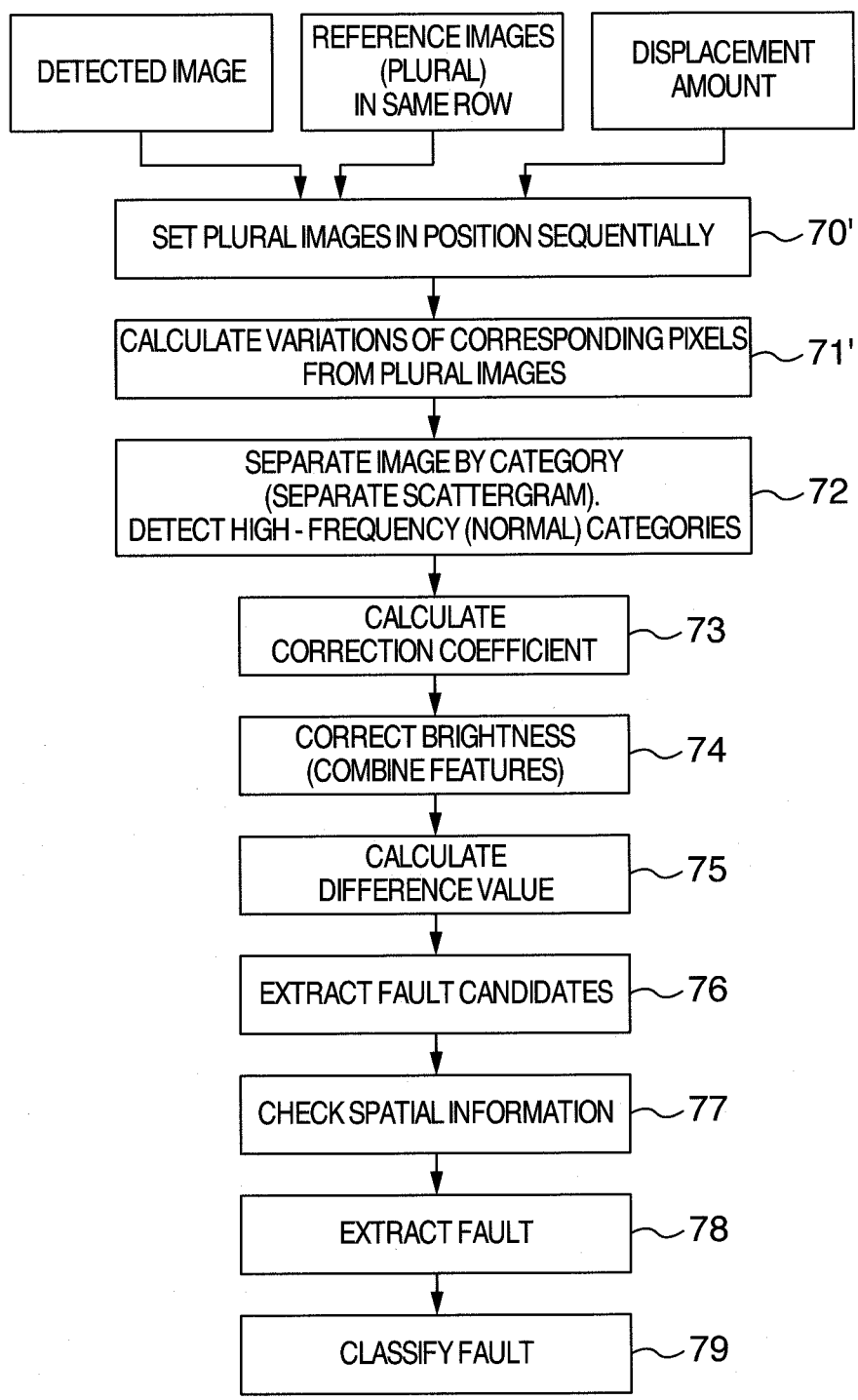
FIG. 20 is a flowchart showing the process flow of the image comparator.

The plurality of the dies described above may be die images included in the horizontal row of the wafer in the case where the image is detected by the continuous feed of the stage. FIG. 20 shows a general example of the processing flow. First, the pixel units of the inspection object image and the reference image are set in position by the displacement amount calculated in the displacement detection unit 507 (70'). The corresponding images of the dies in the same row are also set in position sequentially. From the plurality of the images thus set in position, the variation of the corresponding pixels is calculated as a feature amount (71'), and the object image is separated into a plurality of parts by pixels in accordance with the feature amount. Specifically, the image is separated by each of a plurality of categories thereby to detect a category high in frequency (72'). The subsequent process is similar to that of FIG. 7.

As described above, the variation of brightness or contrast of each pixel is determined between the plurality of comparative dies, and according to the value of the variation thus determined, the pixels are classified into categories. For each category, the brightness is combined using the scattergram, and any deviation or error value is identified as a fault. The separation of the scattergram by category makes it possible to set a smaller threshold value and the detection sensitivity of a fine fault on the state-of-the-art device is improved. As a result, what is called "the potential faults" including the minuscule semi short or voids which otherwise would pass through the final electrical test as well as "the non-visual faults" which decrease the yield and so far could not be detected" are suppressed. Instead of determining the brightness or contrast variation of the pixels between a plurality of comparative dies, such variation may be determined and stored in advance for the future use.

Next, the optical appearance inspection apparatus for the semiconductor wafer according to another embodiment is explained. FIG. 21 shows a modification of the configuration of the apparatus described with reference to FIG. 5. The illumination optical system 502 shown in FIG. 21 includes a lens system 1021 for condensing the light emitted from a light source 501 and a beam splitter 1022 for changing the light path. FIG. 21 shows a case in which the lamp is used as the light source 501. Nevertheless, the laser may be used as an alternative light source. Also, the light emitted from the light source 501 may be short in wavelength or the light (white) having the wavelength in broad band. As the short wavelength light, the ultraviolet (UV) light can be used to improve the resolution of the image to be detected (a fine fault can be detected). In the case where the laser of single wavelength is used as a light source, on the other hand, a means (not shown) to reduce the coherence is required to be arranged in the illumination optical system 502 or between the light source 501 and the illumination optical system 502.

Also, a time delay integration (TDI) image sensor configured of a plurality of one-dimensional image sensors arranged two-dimensionally can be employed as an image sensor 504. The signal detected by each one-dimensional image sensor in synchronism with the movement of the stage 12 is transferred and added to the one-dimensional image sensor in the next process. In this way, the signal can be detected at a comparatively high rate and with a high sensitivity. In the case where a sensor of parallel output type having a plurality of output taps is used as the TDI image sensor, the outputs from the sensor can be processed in parallel and the detection is possible at a still higher rate.

Further, in the case where the light source 501 can emit the UV light, the use of the sensor of back radiation type as the image sensor 504 can improve the detection efficiency as compared with the front radiation sensor.

Numeral 14 designates an image editing unit including a preprocessing unit 505 for image correction such as the shading correction and the dark level correction of the digital signal of the image detected by the detection unit 53, and an image memory 107 for storing the digital signal of the corrected image.

Numeral 15 designates an image comparison processing unit for calculating a fault candidate in the wafer making up the specimen. In the image comparison processing unit 15, the images of the corresponding areas stored in the image memory 107 of the image editing unit 14 are compared and an error value is extracted by the statistical process as a fault. First, the digital signal of the image (hereinafter referred to as the reference image) of the area corresponding to the image (hereinafter referred to as the detected image) of the inspection object area stored in the image memory 107 is read, and the correction amount for positioning is calculated in the displacement detection unit 507. In the statistical processing unit 109, the detected image and the reference image are set in position using the calculated portion correction amount. Then, using the feature amount of the corresponding pixel, the pixel constituting a statistical error value is output as a fault candidate. In the parameter setting unit 110, the image processing parameters such as the threshold value and the feature amount for extracting the fault candidate are set and supplied to the statistical processing unit 109. In the fault classification unit 111, a true fault is extracted and classified from the feature amount of each fault candidate.

Numeral 56 designates an overall control unit including a CPU (built in the overall control unit 56) for performing various control operations. The overall control unit 56 is connected to a user interface unit 510 having a display means and an input means for receiving the change of the inspection parameters (the feature amount, threshold value, etc. used for error value extraction) from the user and displaying the detected fault information, and a storage unit 511 for storing the feature amount and the image of the detected fault candidate. Numeral 512 designates a mechanical controller for driving the stage 52 based on a control command from the overall control unit 56. The image comparison processing unit 15, the detection unit 53, etc. are also driven by the command from the overall control unit 56.

The semiconductor wafer 51 to be inspected, as shown in FIG. 22A, includes a multiplicity of regularly arranged chips 200 of the same pattern each having a peripheral circuit unit 202 and a memory mat unit 201 as shown in FIG. 22C. In the overall control unit 56, the semiconductor wafer 51 providing the specimen is continuously moved by the stage 12 and in synchronism with this movement, the chip images are retrieved from the detection unit 53 sequentially. Then, the same position on the regularly arranged chips, or for example, the area 223 of the detected image shown in FIG. 22C is compared with the digital image signals of the areas 221, 222, 224, 225 as a reference image following the steps described above, and the pixel statistically constituting an error value is detected as a fault candidate.

Figure 23:
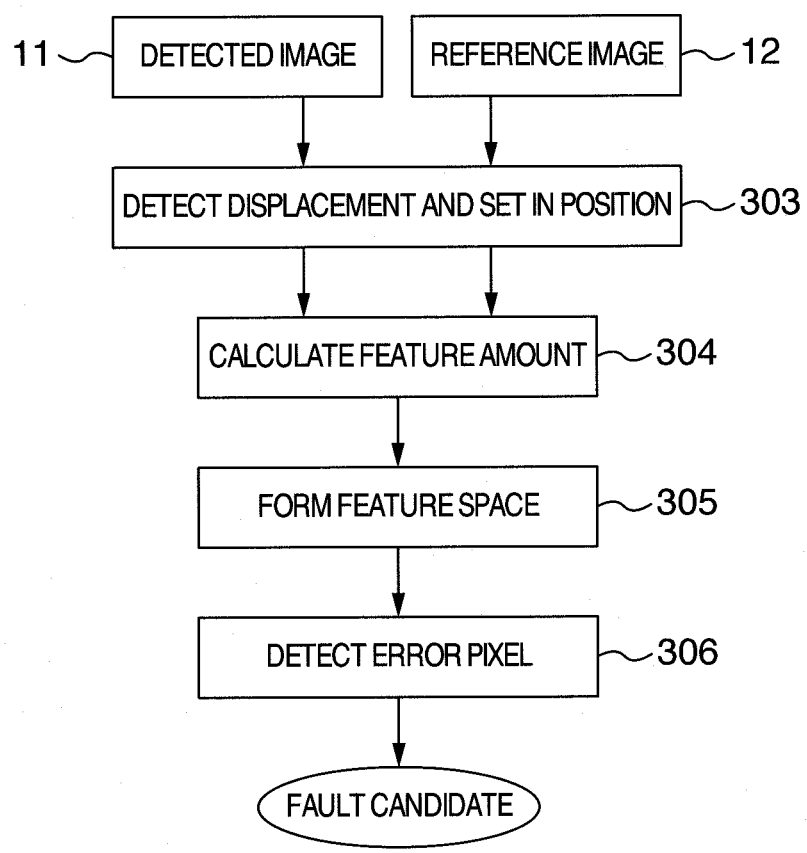
FIG. 23 is a diagram showing an example of the process flow for extracting a fault candidate.

FIG. 23 shows an example of the processing flow, in the image comparison processing unit 15, of the image 223 of the chip to be inspected as shown in FIG. 22B. First, with respect to the reference image 12 (assume here to be the image 222 of the adjacent chip) corresponding to the image (detected image 11) of the chip to be inspected, the displacement is detected and set in position (303). Next, with regard to each pixel of the detected image 11 thus set in position, a plurality of feature amounts are calculated for the corresponding pixels of the reference image 12 (304). The feature amount may be the one indicating the feature of the particular pixel. An example includes (1) brightness, (2) contrast, (3) grayscale difference, (4) brightness variance values of the neighboring pixels, (5) correlation coefficient, (6) brightness change with neighboring pixels and (7) secondary differential value. An example of the feature amounts is expressed as Brightness: f(x, y) or $$\{f(x,y)+g(x,y)\}/2 \quad (8)$$

Contrast:

$$\max\{f(x,y),f(x+1,y),f(x,y+1),f(x+1,y+1)\}-\min\{f(x,y),f(x+1,y),f(x,y+1),f(x+1,y+1)\} \quad (9)$$

Grayscale difference:

$$f(x,y)g(x,y) \quad (10)$$

Variance:

$$[\Sigma\{f(x+i,y+j)\}^2 - \{\Sigma f(x+i,y+j)\}^2/M]/(M1) \quad (11)$$

$$i,j=1,0,1, M=9$$

where f(x, y) is the brightness of each point on the detected image and g(x, y) the brightness of the corresponding reference image. Among these feature amounts, each pixel is plotted in the space with at least two feature amounts as an axis thereby to form a feature space (305). The pixels plotted outside the data distribution in the feature space, i.e. the pixels constituting a feature error value are detected as fault candidates (306).

FIGS. 24A, 24B are diagrams showing an example of the feature space formation (305) in the flowchart of FIG. 23. FIG. 24A shows the steps up to the feature space formation (305) of FIG. 23, and FIG. 24B shows an example of the feature space formed by calculating the feature amounts from the pixels at the corresponding positions in the detected image 11 and the reference image 12 and plotting each point in the two-dimensional space with the feature amounts A, B as axes. In the feature space 40, the dots defined by dashed line indicate the pixels constituting an error value outside the congested data distribution. FIG. 24C shows the difference image with the brightness difference of the pixels between the detected image 11 and the reference image 12 as indicated by the values 0 to 255 (256 gradations). The smaller the difference, the darker the pixel, while the larger the difference, the brighter the pixel. In FIG. 24C, the difference is increased at the portion of the normal pattern having different brightness between two images other than a fault (illustrated as brightness irregularities). In the conventional method in which the portion having the brightness difference between the images larger than the threshold value is detected as a fault, these brightness irregularities are also detected as a fault. FIG. 24D shows the distance image indicating the distance from the center of the congested data distribution by the values 0 to 255 (256 gradations) in the feature space 40. In the feature space, only the faults constituting an error value are bright, and the brightness irregularities are suppressed so that only faults are detected.

According to this embodiment, the feature space can be formed as a N-dimensional space, N being not less than 3. An example is shown in FIG. 25 which is a diagram showing another example of the feature space formation (305) in the flowchart of FIG. 23. FIG. 25A shows the steps up to the feature space formation (305) of FIG. 23, and FIG. 25B an image diagram of the feature space formed by calculating the feature amounts from the pixels at the corresponding positions in the detected image 11 and the reference image 12 and plotting each point in the N-dimensional space with N feature amounts as axes. In the N-dimensional feature space 50, a fault can be detected from noises having a great variety of features by detecting an error value. FIG. 25C shows a difference image between the detected image 11 and the reference image 12, and the portion having a large difference other than indicated as a fault is a normal pattern such as brightness irregularities. FIG. 25D shows a distance image in the feature space 50. Thus, in the space having a plurality of feature amounts, a great variety of noises of the normal pattern are suppressed and only a fault can be detected by detecting a feature error value.

As explained above, according to this embodiment, N feature amounts are selected from a plurality of them and form a feature space, while detecting a feature error value as a fault candidate. An optimum feature amount is selected in accordance with the feature of noises desirous of being suppressed and the fault type desirous of being detected. An example is shown by Equations (8) to (11). Another example of the feature amount is the brightness data converted to lower bits.

Figure 26A:
FIGS. 26A to 26D are diagrams showing an example of the pattern brightness variations between chips to be compared.
Figures 26B, 26C:
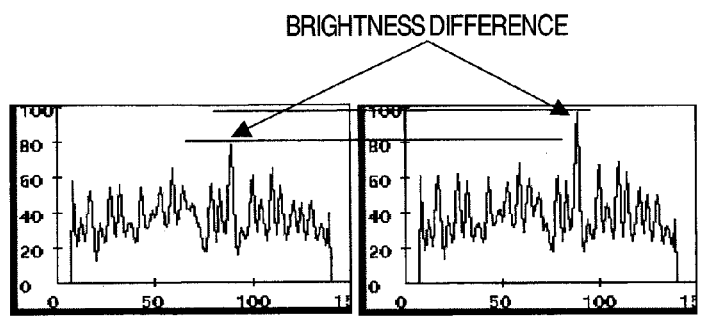
Figure 26D:
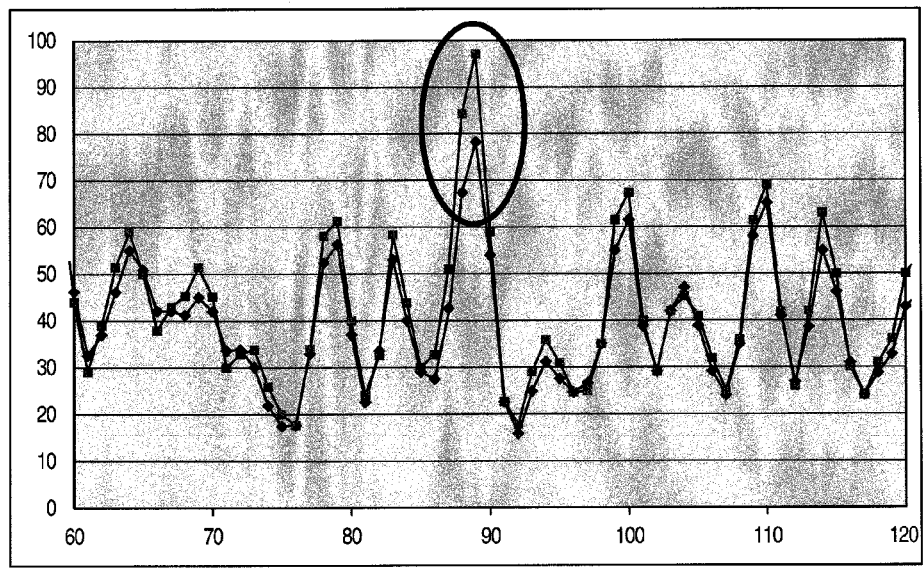

FIG. 26A shows the difference image between the detected image and the reference image, FIG. 26B the brightness waveform of the detected image at the position indicated by dashed line in FIG. 26A, and FIG. 26C the brightness waveform of the reference image at the position indicated by dashed line in FIG. 26A. FIG. 26D shows the superposition of the portions of the waveforms of FIGS. 26B and 26C having especially different peak positions. As understood from the waveform shown in FIG. 26D, the brightness of a specific pattern is different between the two images, and therefore, the resulting large difference is detected as a fault.

Figures 27A, 27B:
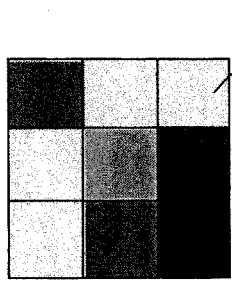
FIGS. 27A to 27C are diagrams showing an example of the low bit conversion and the effects thereof.
Figure 27C:
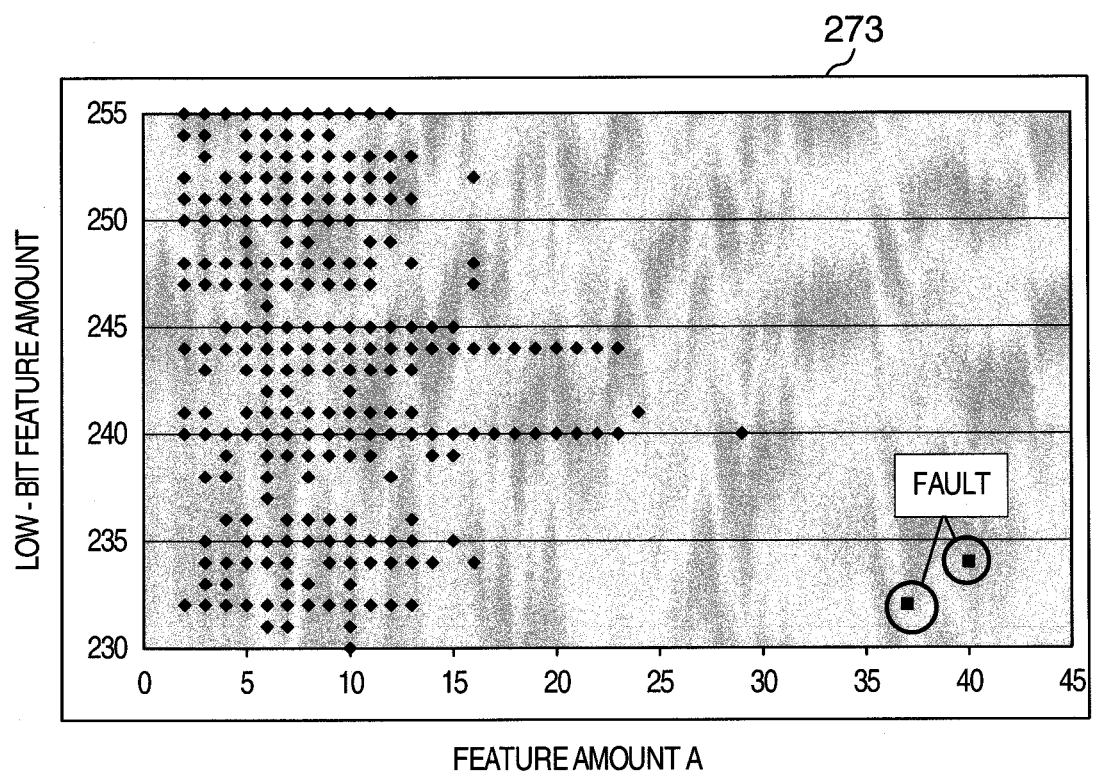

FIG. 27 shows an example of application of the feature amount of this image converted into low bits. In FIG. 27A, numeral 271 designates the brightness of a total of nine pixels including an intended object pixel and eight neighboring pixels. In FIG. 27B, numeral 272 designates the brightness size relation between the intended object pixel and the eight neighboring pixels in terms of 1 bit data, i.e. 1 as bright and 0 as dark. The arrangement of the data converted in the eight neighbors, i.e. the value 11000110 as digits arranged clockwise from the position of 12 o'clock is determined as a feature amount of the intended object pixel. In FIG. 27C, numeral 273 designates a two-dimensional feature amount space in which the ordinate represents the feature amount calculated by comparing the arrangement of 1 bit by 8 elements between the corresponding pixels calculated for all the pixels of the detected image and the reference image and the abscissa represents another feature amount. The portions surrounded by circles indicate defective pixels, and the pixels having a large difference due to the brightness variation is plotted in the portion of dense data distribution.

Figure 28:
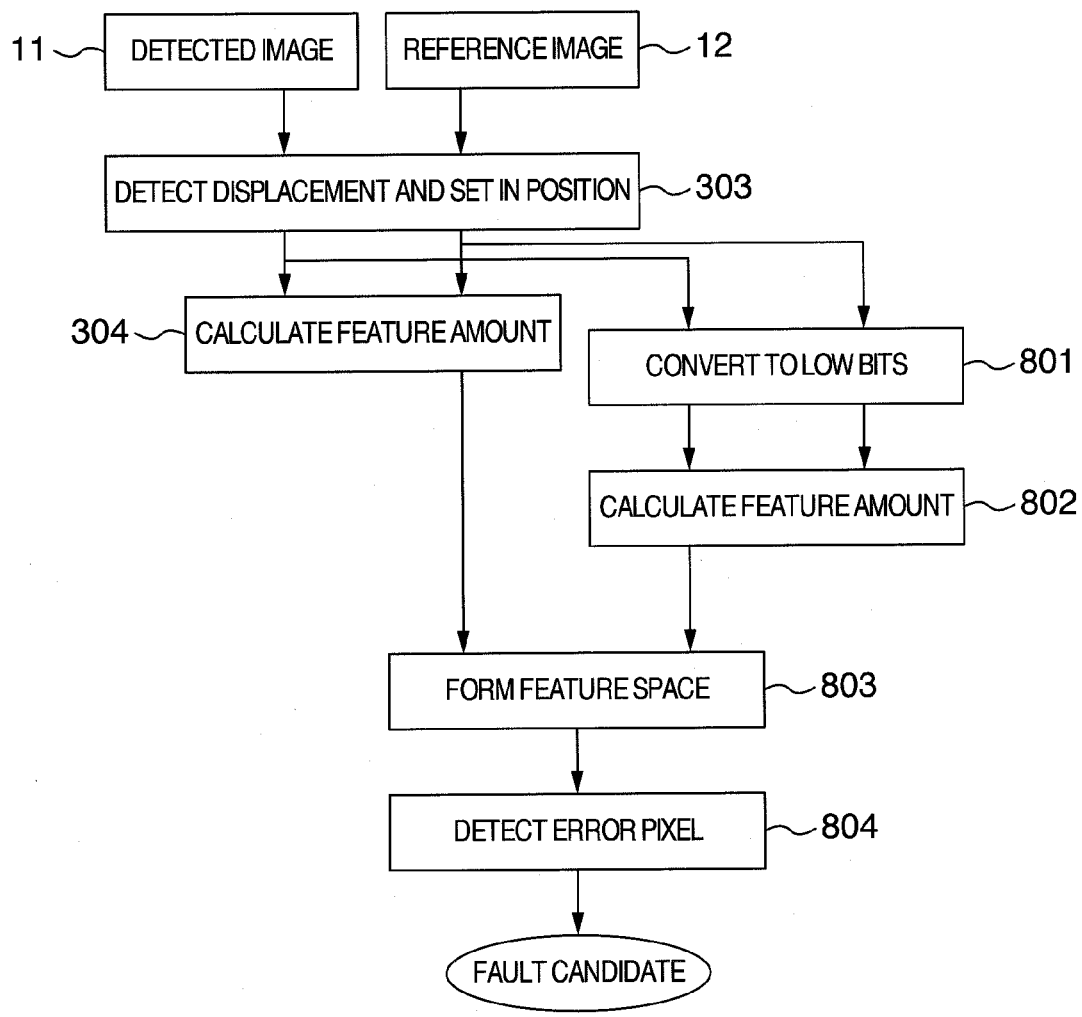
FIG. 28 is a diagram showing an example of the flow of the process for the error value detection with the low bit conversion value as a part of the feature amount.

FIG. 28 shows an example of the processing flow of the image comparison processing unit 15 with the feature amount calculated by conversion to low bits. After the detected image 31 and the reference image 32 are set in position (303), the feature amount is calculated (304) and the two images are converted to low bits (801). The feature amount is calculated from the low bit value of the corresponding pixels (802). The feature amount is selected, in accordance with the fault types desirous of being detected and the noises desirous of being suppressed, from a plurality of feature amounts calculated from the low bit value and a plurality of feature amounts calculated from the original brightness value, so that the feature space (803) is formed and the error value is detected as a fault candidate (804).

Figure 29:
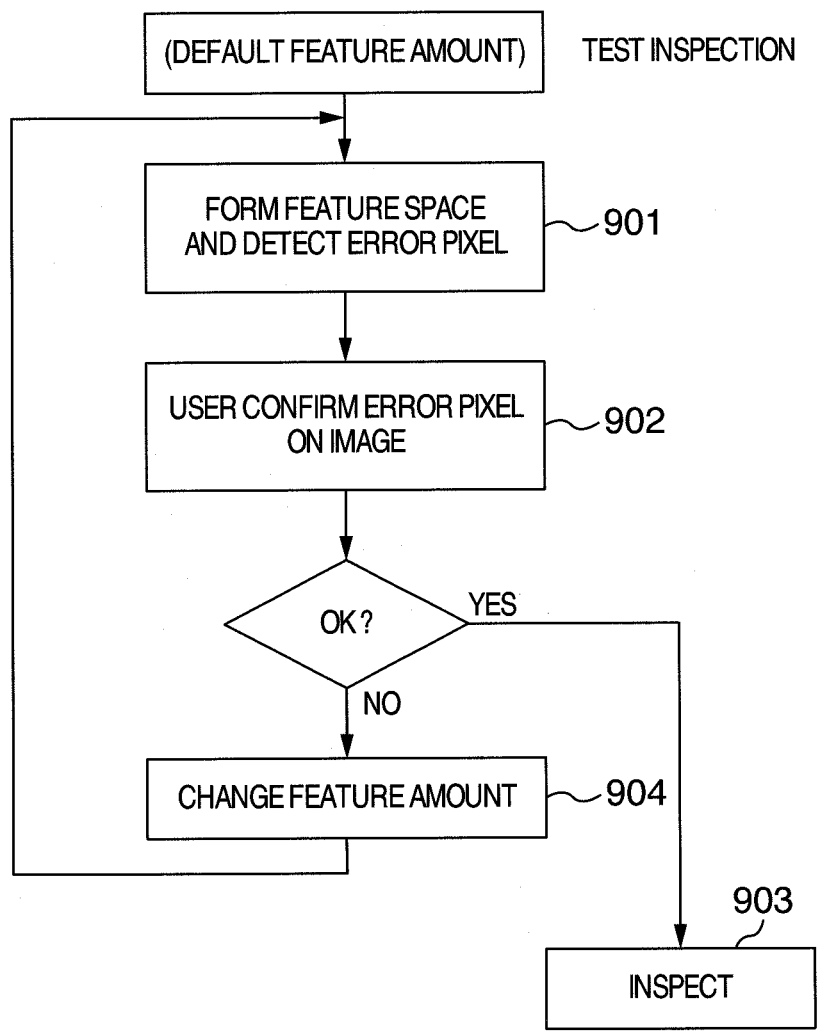
FIG. 29 is a diagram showing an example of the processing flow for feature amount selection.

FIG. 29 shows an example of the process of selecting the feature amount corresponding to the fault types desirous of being detected and the noise types desirous of being suppressed. First, as a test inspection, the flow of the process explained with reference to FIG. 28 is executed to detect an error value from a preset default feature amount (901). The user confirms, on the monitor of the user interface unit 510, the image in the surrounding area of the pixel detected as an error value (902). In the process, the images of the corresponding areas of the reference image are also arranged and displayed, and therefore, the user can visually compare them. Upon determination that the detected error value is the desired fault for the user, the selection of the feature amount is finished and the inspection executed (903). Upon determination that the desired fault type is not detected, on the other hand, the feature amount change from the user is received (904), and the feature space due to the changed feature amount is formed while at the same time detecting an error value (901). Subsequently, the error value detection by reformation of the feature space, the display of the result and the change of the feature amount are repeated until the result satisfactory to the user is obtained.

Figure 30A:
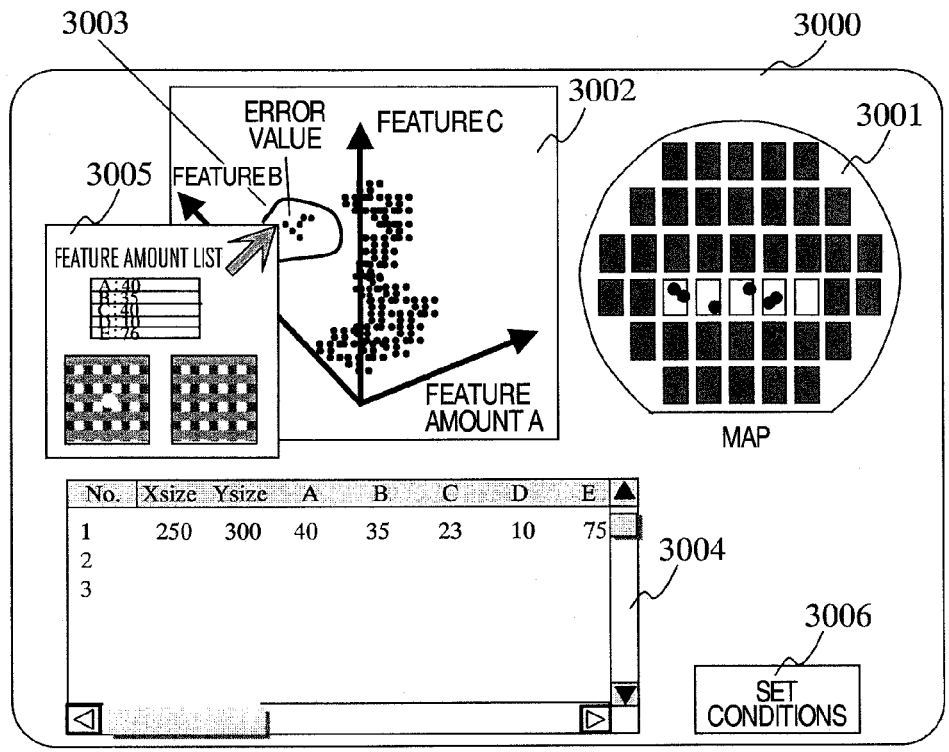
FIGS. 30A to 30C are diagrams showing an example of the condition setting screen.
Figure 30B:
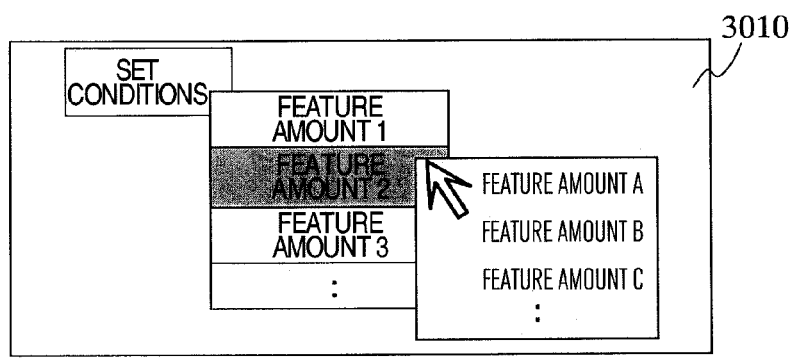
Figure 30C:
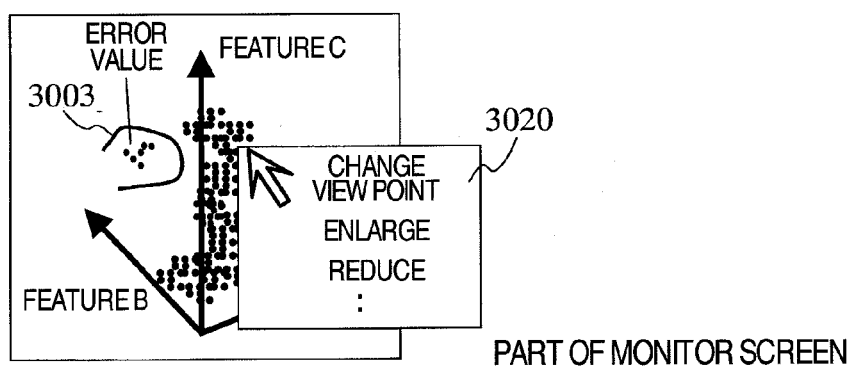

The process of displaying the error value detection result on the monitor of the user interface unit 510 and the confirmation and the feature amount selection by the user is shown in FIG. 30. In FIG. 30A, numeral 3000 designates a part of the detection result screen displayed on the monitor, and numeral 3001 a fault map indicating the position of faults on the wafer. The chips inspected are indicated as bright spots (central five chips in this case), and the detected faults are plotted thereon. Numeral 3002 designates the feature space with the peripheral area where the fault is detected. In the feature space, the normal pixels and the pixels determined as error values are indicated by different colors, and the area of the error values is indicated by a curved surface (or a curved line in the case where the feature space is two-dimensional) (3003). Further, a fault list including the sizes of the detected faults and all the feature amounts is displayed (3004). Upon designation of any one of the faults on the fault map 3001, the feature space 3002 and the fault list 3004 with mouse, a list of the reference images corresponding to the images around the error value the feature amounts is displayed (3005). In the case where the error value is not the desired fault type, the user selects the condition setting button 3006 with mouse. Upon depression of the condition setting button 3006, as indicated by numeral 3010 in FIG. 30B, a list of feature amounts is displayed, so that each feature space axis can be selected and changed. Also, as shown in FIG. 30C, the position of the view point in the feature space can be changed (i.e. the feature space can be rotated), and the local area at the changed view point can be enlarged or reduced (3020). Once the feature amount is changed by 3010 in FIG. 30B, the result of the repeated detection is displayed.

Figure 31A:
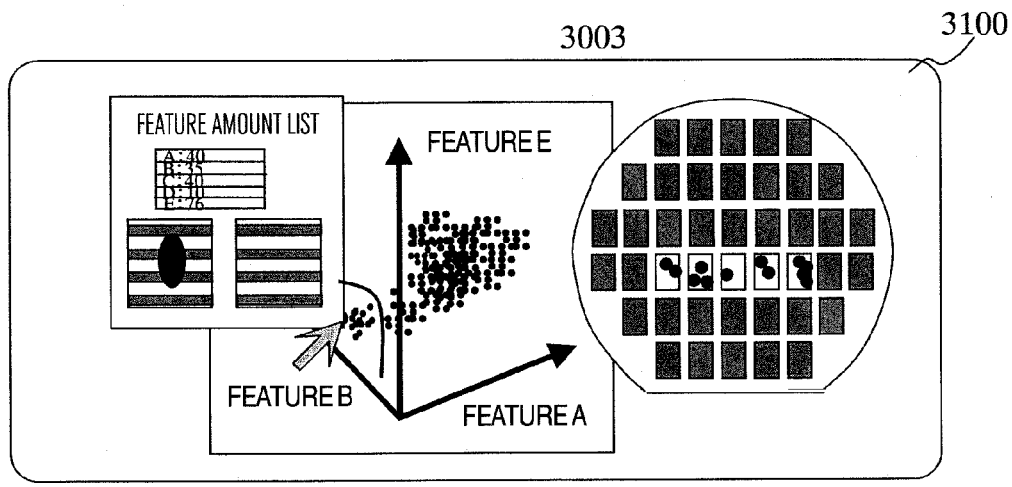
FIGS. 31A to 31C are diagrams showing another example of the condition setting screen.
Figure 31B:
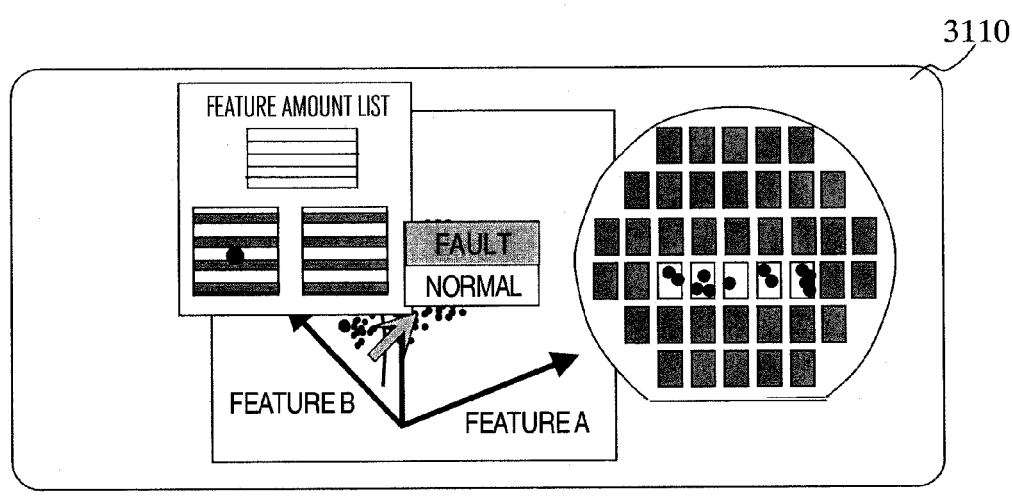

Numeral 3100 in FIG. 31A designates an example of the feature space due to the changed feature amount and the monitor screen for displaying the detected fault map, on which the detection of different fault types can be confirmed. In this way, the user, while confirming the detected fault type and the degree of deviation of the error value from the normal pixel, can select the feature amount with which the desired fault type can be detected with high sensitivity. In other words, according to this invention, a great variety of fault types can be detected by changing the feature amount variously and detecting the error value. Further, the sensitivity of detecting the error value can be changed by the user while confirming the detected error value. According to this invention, the images and the feature amount list of the data other than the error value, like the faults, can be confirmed by designating the non-error value data with mouse on the feature space. In the case where the data other than the error value is confirmed in the feature space displayed on the monitor screen 3100 and the particular data is the fault desirous of being detected, for example, the threshold area can be enlarged in such a manner as to include the data. The monitor screen 3110 shown in FIG. 31B is an example. In the case where the image of the data in the normal area is confirmed and the particular image is a fault to be detected, then the presence of a fault is taught.

Figure 31C:
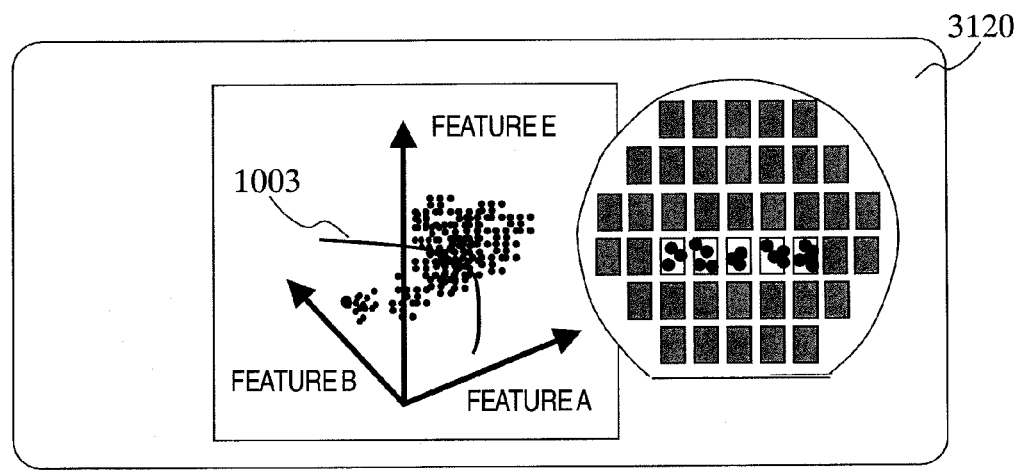

According to this invention, the area of the error value is changed in such a manner that the data thus taught represents an error value. The monitor screen 3120 shown in FIG. 31C displays the result of expanding only the threshold value constituting the error value area without changing the feature amount. With the expansion of the error value area, the number of faults increases, which is reflected in the fault map. Similarly, in the case where the pixel constituting an error value is confirmed as a non-fault, the normalcy is taught from the menu 3110. As a result, the error value area can be narrowed so that the taught data may not constitute an error value. In this way, the user can change the sensitivity by confirming the image and the feature amount and teaching the advisability of detection.

Incidentally, the image used for the test inspection is stored in the memory after the first image acquisition and therefore not required to be acquired each time of feature amount change. Also, in the case where the memory capacity is small or the test inspection area is so wide that all the images cannot be stored in the memory, the acquired images are temporarily stored in a storage medium such as a hard disk. Also, several sets of feature amounts are selected in advance and the error value is detected by feature space at a time, followed by arranging and displaying the detection result (3000 in FIG. 30, 3100 in FIG. 31, etc.).

According to this embodiment, in the case where the images of the desired fault types detected in the past inspection are held or otherwise the faults desirous of detection are known, the user, by teaching the same, can automatically select the feature amount and set the error value area. In FIG. 32A, numeral 3200 designates an example of a part of the monitor display of the user interface unit 510 before inspection. The user selects the teaching button with mouse and designates the folder holding the images and feature amounts thereby to designate the image of a fault and the feature amount. In the inspection apparatus according to this invention, these data are read, and as indicated by 3201 in FIG. 32B, lists of fault images and the reference image are displayed side by side. The user designates, with a rectangle, a defective part desirous of being detected and thus teaches that the particular part is a fault. After being sequentially taught in this way, the user selects the condition setting 3202. Then, the feature amount is selected and the error value area set automatically in such a manner that the designated defective pixel is farthest from the data distribution of the non-defective pixels on the feature space. At the same time, the axis is also scaled automatically. As a result, the conditions 3220 in FIG. 32D are automatically selected for the default conditions 3210 shown in FIG. 32C.

Figure 33A:
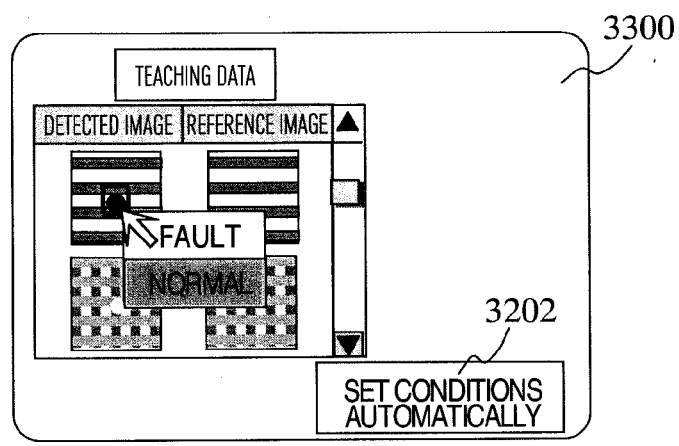
FIGS. 33A to 33C are diagrams showing an example of the teaching screen for eliminating the unrequired information.
Figure 33B:
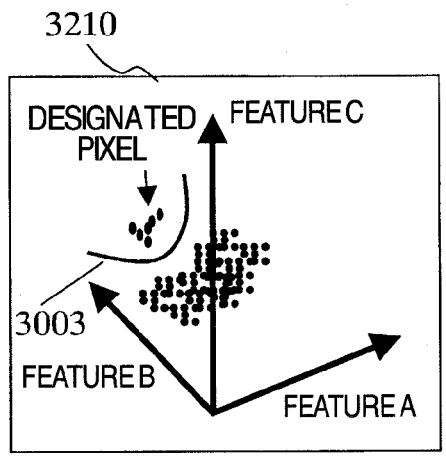
Figure 33C:
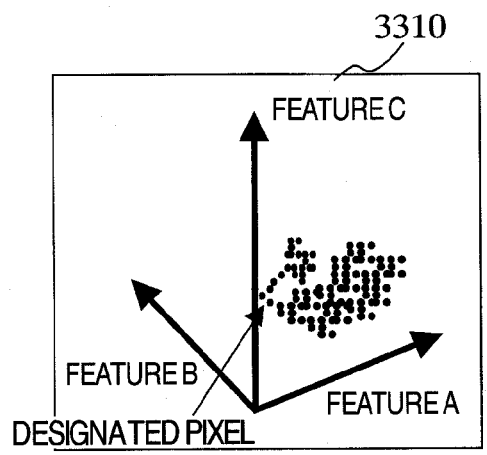

Even in the actual fault image, the fault not required to be detected by the user is designated by a rectangle as shown by 3300 in FIG. 33A, thereby teaching that it is a normal pixel. As a result, according to this invention, the feature amounts are selected, the error value area is set and the axial scaling effected automatically in such a manner that the designated defective pixel is nearest to the data distribution of non-select pixels. Thus, the conditions 3310 of FIG. 33C are selected automatically for the default conditions 3210 of FIG. 33B.

Figure 34A:
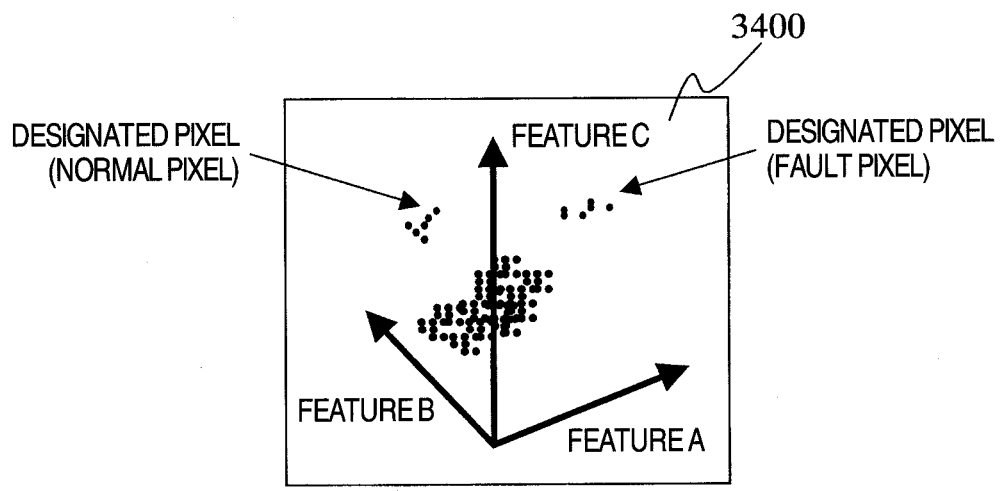
FIGS. 34A and 34B are diagrams showing an example of the threshold setting to eliminate the unrequired information.
Figure 34B:
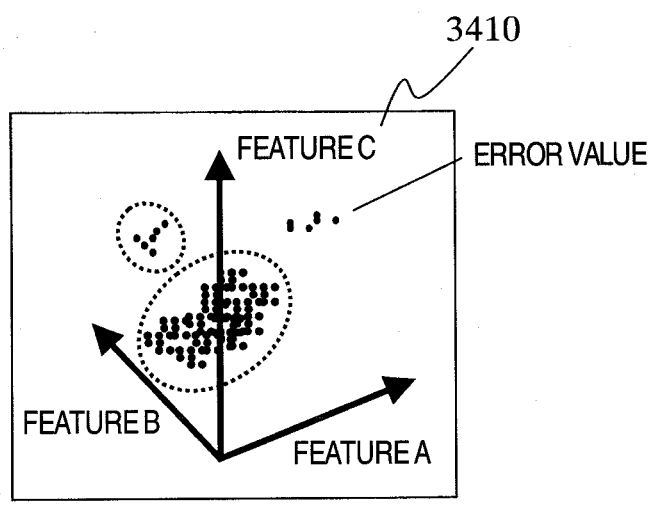

In similar fashion, pixels requiring no detection such as the areas desirous of being determined as noises or non-inspection areas are designated and the normalcy is sequentially taught. Numeral 3400 in FIG. 34A shows an example in which the conditions for determining an error value based on only the pixels designated as a fault are not found on the feature space and the pixels designated as normal also constitute an error value. In this case, according to this embodiment, a plurality of normal areas are set (the distribution defined by dashed line 3410 in FIG. 34B) and only the data outside it can be determined as an error value.

Figure 35A:
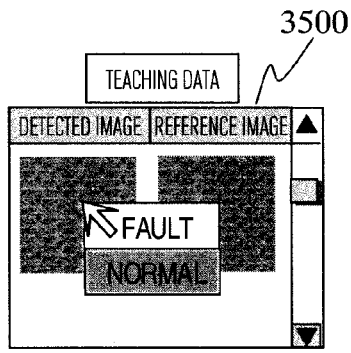
FIGS. 35A to 35F are diagrams showing an example of the threshold setting to detect an important fault alone.
Figure 35B:
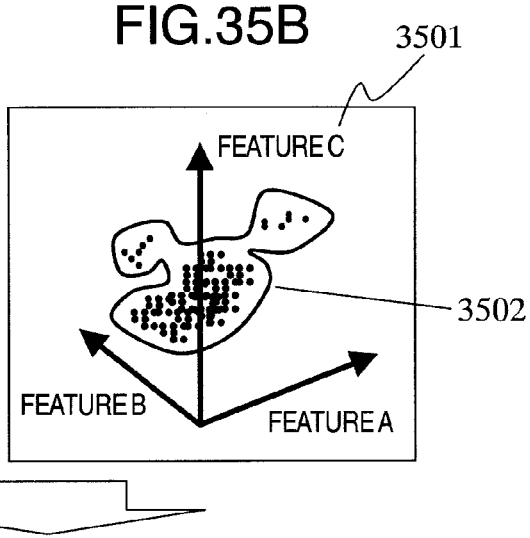
Figure 35C:
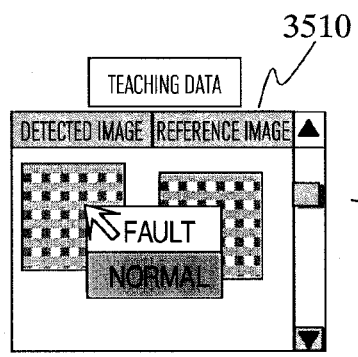
Figure 35D:
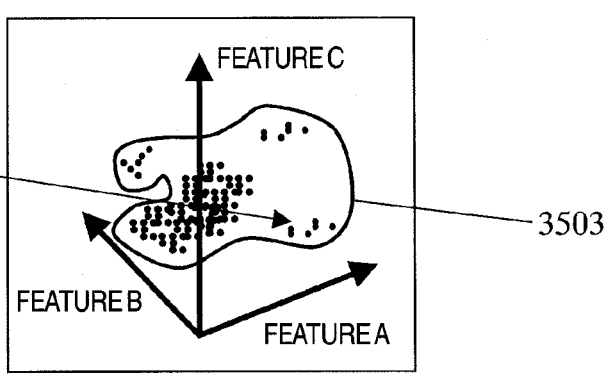
Figure 35E:
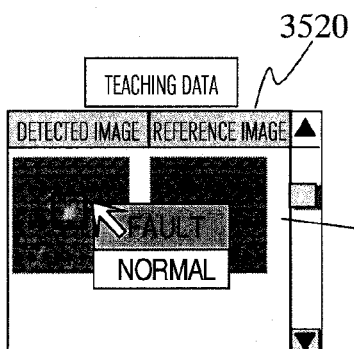
Figure 35F:
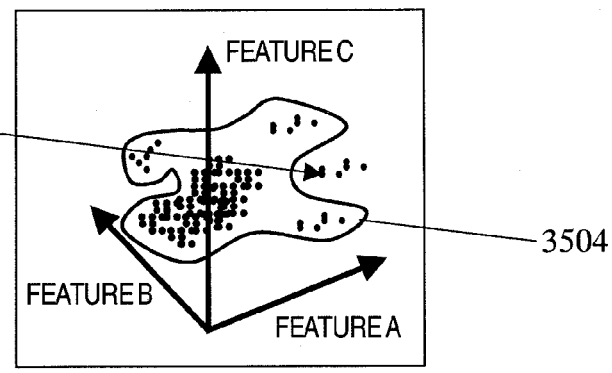

In the absence of the known fault information, on the other hand, the conditions can be set automatically by teaching only the normal portion. An example is shown in FIG. 35. First, the image of the normal pattern of the specimen is picked up, and as shown by 3500 in FIG. 35A, the entire area is designated as normal. This process is executed for several points to select the automatic condition setting. According to this embodiment, in the absence of the teaching of the defective portion, as indicated by the feature space 3501 in FIG. 35B, the area outside the envelope (minimum area surrounding the normal distribution) 3502 of the distribution of all the taught pixels is determined as an error value area. Then, the test inspection is conducted, and the area plotted and detected outside the envelope 3502 is further taught thereby to optimize the error value area. Numeral 3510 in FIG. 35C indicates an image determined as an error value by the test inspection. In the case where this is not a fault, the user teaches that the entire area is normal. According to this embodiment, as shown in FIG. 35D, assuming that the image data of 3510 is plotted in the feature space 3501, the envelope is expanded in such a manner as to include the particular data (3503). In similar fashion, numeral 3520 in FIG. 35E designates an image determined as an error value by being plotted outside the envelope 3502 in the test inspection. In the case where this is a fault, as described above, the user designates the particular defective pixel and teaches that it is a fault. According to this embodiment, the data on the defective part 3520 is plotted in the feature space 3501 as shown in FIG. 35F and the envelope is set in such a manner that the defective pixel constitutes an error value (3504).

With the inspection apparatus explained in the embodiments of the invention described above, the faults embedded in noises can be detected with high sensitivity by detecting the error value in the feature space. There are various faults crucial to the user, each of which has a variety of features by combinations of the factors dependent on objects such as the kind of the specimen to be inspected, material, surface roughness, size, depth, pattern density and pattern direction on the one hand and the factors depending on the optical system such as the illumination conditions on the other hand. As explained with reference to each embodiment above, a plurality of types of feature amounts are prepared, and the user can select an appropriate feature amount type interactively in accordance with the fault type desirous of being detected by the user. In this way, a great variety of faults can be detected with high sensitivity. In similar fashion, the sensitivity adjustment in keeping with various noises and patterns can be facilitated by the user interactively teaching the features of the noises and patterns requiring no detection.

In this example, the feature amount of the reference image is calculated as an image (223 in FIG. 22) of the adjacent chip. Nevertheless, a reference image may be the one generated from the average value of a plurality of chips (221, 222, 224, 225 in FIG. 22) or by the one-to-one comparison between chips 223 and 221, between chips 223 and 222, . . . , between the chips 223 and 225 in a plurality of areas and statistically processing all the comparison results to detect a fault according to the method of the invention.

The chip comparison processing has been explained as an example. In the case where the peripheral circuit portion and the memory mat portion coexist in the inspection object chip as shown in FIG. 22C, however, the cell comparison made in the memory map is also covered by the invention. FIG. 36 is a diagram for explaining the application to the cell comparison. The memory mat portion is configured of a mass of small repetitive patterns (cells). In cell comparison, the adjacent cells, i.e. the pixels corresponding to the cell interval of the images of the memory mat portion are compared with each other, and the portion with the brightness difference larger than the threshold value is detected as a fault. In the method according to the invention, on the other hand, as shown in FIG. 36B, a plurality of corresponding reference pixels (pixels distant by an integer multiple of cell pitch) are used for an inspection object pixel to calculate the feature amount between the inspection object pixel and the reference pixels. In the subsequent process, like in the chip comparison explained above, the error value on the feature space is extracted as a fault candidate.

The process of the image comparison processing unit 15 according to an embodiment described above is implemented by software processing using the CPU. Nevertheless, the core arithmetic operation such as the calculation of the normalized transform and the feature amount for displacement detection can be alternatively executed by hardware using the LSI, etc.

This realizes a high-speed operation. Also, even with the delicate pattern thickness difference after the flattening process such as CMP (chemical mechanical polishing) or the large brightness difference between the chips to be compared due to the short wavelength of the illumination light, the invention makes possible the detection of a fault about 20 nm to 90 nm in size.

Further, in the inspection of low-k films including an inorganic insulating film such as $SiO_2$, SiOF, BSG, SiOB or porous silica film and organic insulating films such as $SiO_2$ containing methyl base, MSQ, polyimide film, paylene film, Teflon.®. film and amorphous carbon film, faults of 20 nm to 90 nm can be detected in spite of the local brightness difference due to variations of refractive index variation in the films according to the invention.

The comparative inspection object image was explained as an example in the optical appearance inspection apparatus for the semiconductor wafer according to an embodiment of the invention. Nevertheless, the invention is applicable also to the comparative image in the electron beam pattern inspection and the fault inspection with dark field illumination.

Figure 37:
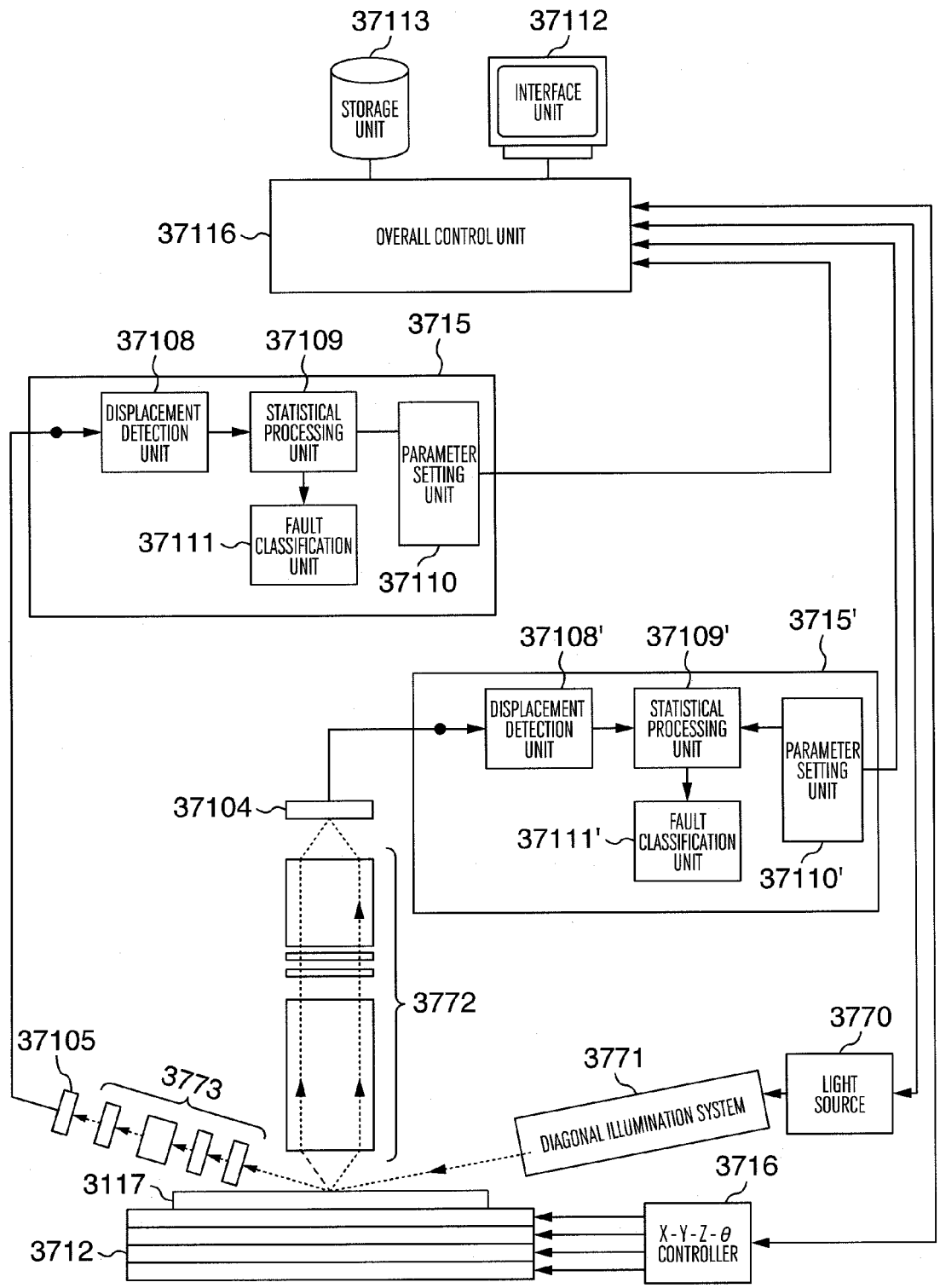
FIG. 37 is a diagram showing another example of the configuration of the inspection apparatus.

FIG. 37 shows an embodiment of the invention used for the fault inspection apparatus with dark field illumination. The fault inspection apparatus shown in FIG. 37 includes an X-Y-Z-.theta. stage 3712 movable along three axes with a specimen (semiconductor inspection object substrate) 3711 mounted thereon, an X-Y-Z-.theta. controller 3716, a light source 3770, a diagonal illumination system 3771, an upper detection system 3772, a diagonal detection system 3773, an image comparative processing unit 3715 for the diagonal detection system, an image comparative processing unit 3715' for the upper detection system, an overall control unit 37116, a user interface unit 37112 and a storage unit 37113.

In this configuration, the illumination light such as laser emitted from the light source 3770 is radiated on the specimen 3711 mounted on the X-Y-Z-.theta. stage 3712 through the illumination optical system 3771, and the scattered light from the specimen 3711 is condensed by the upper detection system 3772 and subjected to photoelectric conversion by detection in the photoelectric converter 3710. On the other hand, the scattered light from the specimen 3711 is condensed also by the diagonal detection system 3773, and subjected to photoelectric conversion by detection in the photoelectric converter 37105. In the process, the X-Y-Z-.theta. stage 3712 is moved in horizontal direction while detecting the scattered light from the specimen 3711. In this way, the detection result is obtained as a two-dimensional image.

The image thus obtained is input to the image comparative processing units 3715, 3715', respectively. The image comparative processing units 3715, 3715' each include a displacement detection unit 108 of the image comparative processing unit 15 of the optical appearance inspection apparatus of bright field type described with reference to FIG. 21, a statistical processing unit 109, a parameter setting unit 110 and displacement detection units 37108, 37108' corresponding to the fault classification unit 111, statistical processing units 37109, 37109', parameter setting units 37110, 37110' and fault classification units 37111, 37111'. As in the optical appearance inspection apparatus of bright field type according to the embodiment described above, the images obtained are compared to detect a fault.

Figure 38:
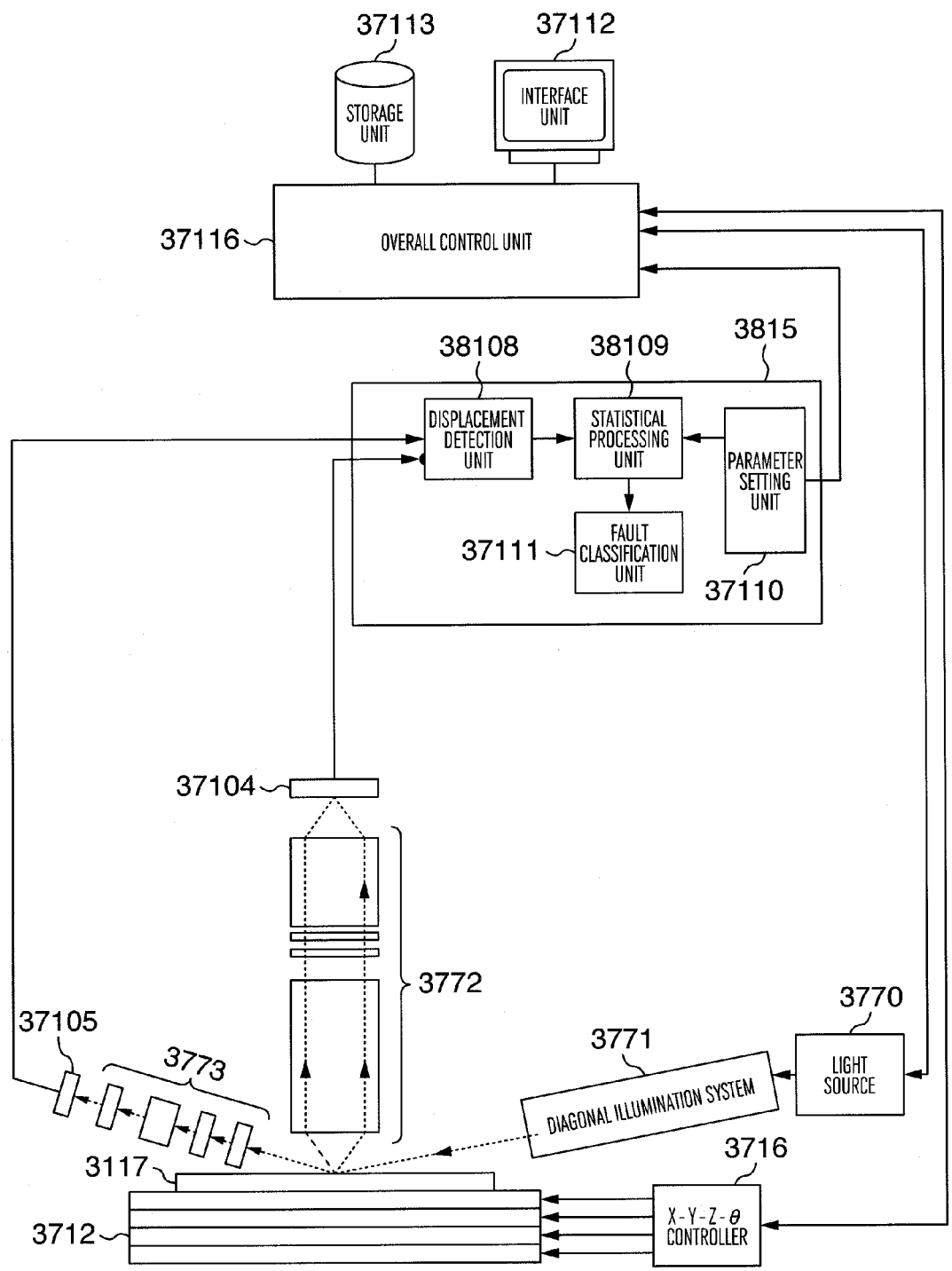
FIG. 38 is a diagram showing still another example of the configuration of the inspection apparatus.

The images obtained from the two detection systems 3772, 3773 may not necessarily individually processed by being input individually to the comparative processing units 3715, 3715'. Instead, faults can be detected integrally. An example of the configuration therefore is shown in FIG. 38. Two types of images obtained from two detection system 3772, 3773 are input to a common image comparative processing unit 3815 and set in position in a collation unit 38108. The error value on the feature space is detected as a fault candidate in the statistical processing unit 38109. The feature space, as shown in FIG. 39, may have a feature axis in a plurality of feature amounts calculated and selected from different images including any one of the feature amounts calculated from the images obtained by the detection system 3772, any one of the feature amounts calculated from the images obtained by the detection system 3773 or any one of the feature amounts calculated from the integrated one of the images obtained from the detection systems 3772, 3773.

The object to be inspected is not limited to the semiconductor wafer, but may be the TFT substrate, photomask, printed board, etc. as far as faults are detected by image comparison.

An embodiment of the invention was explained above taking the comparative inspection object image as an example in the optical appearance inspection apparatus for the semiconductor wafer. Nevertheless, the invention is applicable to not only the bright field illumination method and the dark field illumination method for illumination without the objective lens but also to the electron beam-type pattern inspection for detecting an image using the electron beam and the optical appearance inspection using DUV (deep ultraviolet) light, VUV (vacuum ultraviolet) light or EUV (extreme ultraviolet) light as a light source. In this case, the detection sensitivity of 30 nm to 70 nm can be achieved. Also, the object to be inspection is not limited to the semiconductor wafer, but any of the TFT substrate, photomask, printed board, etc. is covered by the invention as far as their faults are detected by image comparison.

According to this invention, the variation of brightness or contrast of the pixels is determined between a plurality of comparative dies, and by the value thereof, the pixels are divided into categories, for each of which the feature amount such as brightness is combined using the scattergram, with the result that an error value is identified as a fault. In this way, patterns having different variations of brightness, etc. can be separated from each other, and further, the feature amount that cannot be combined is detected, thereby improving the detection sensitivity of a minuscule fault.

Also, according to this invention, the comparison using the information on the scattergram and the separation information on the scattergram constituting a kind of the multidimensional space makes possible the inspection of high sensitivity without being affected by the incoincidence of the normal portion. Further, by combining the object feature such as brightness, the generation of false information is reduced. As a result, a low threshold value can be set and a high-sensitivity inspection realized. Also, both the generation of false information can be reduced and a fault can be detected with high sensitivity at the same time, thereby further facilitating the sensitivity adjustment.

Also, according to the invention, the optimum feature amount for detecting the fault type desired by the user is selected interactively from a plurality of feature amounts, so that the desired fault can be detected with high sensitivity from a great variety of fault types and noises.

Also, the sensitivity corresponding to the fault types and patterns can be easily set by teaching the fault types desired by the user and the patterns not desired by the user.

Further, the image is converted into low bits and the value thus calculated constitutes a part of the features amount, so that the noises due to the brightness variation can be tolerated.

Furthermore, the application of the invention to the comparative inspection in the optical appearance inspection apparatus makes it possible to achieve the detection sensitivity of 50 nm. Also, the application of the invention to the electron beam pattern inspection and the appearance inspection with DUV as a light source can achieve the detection sensitivity of 30 to 70 nm. In addition, the hardware size for image processing can be suppressed to a rational level.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A pattern inspection method for inspecting a pattern fault, comprising the steps of:
    acquiring a reference image by radiating light on a first patterns formed on a specimen;
    processing an inspection image and the reference image and calculating the feature amount of each pixel of the inspection image;
    comparing the feature amount of each pixel with the feature amount of other pixels and extracting a pixel having a unique feature amount as a fault candidate;
    comparing a kind of the fault candidate extracted by the comparing step with an intended kind of faults;
    changing a kind of feature amount calculated by the processing step and repeating the processing step and the comparing step, if a result of comparing doesn't match an intended condition; and
    inspecting the fault candidate if the result of comparing matches the intended condition.

2. The pattern inspection method according to claim 1, wherein a plurality of types of the feature amounts for extracting the fault candidates are determined between the images compared for each pixel in the inspection object image.

3. The pattern inspection method according to claim 2, wherein a feature space is formed from the plurality of types of the feature amounts and the pixels constituting an error value are extracted as fault candidates in the feature space.

4. The pattern inspection method according to claim 3, wherein the information of the fault types constituting an error value in the feature space are displayed on a screen.

5. The pattern inspection method according to claim 1, wherein the inspection image and the reference image are acquired by bright field illumination of the first and second patterns.

6. The pattern inspection method according to claim 1, wherein the inspection image and the reference image are acquired by dark field illumination of the first and second patterns.

7. A pattern inspection apparatus for inspecting a pattern fault, comprising:
    an image acquisition means for radiating light on first patterns and second patterns formed on a specimen, and acquiring a reference image and an inspection image, respectively;
    a feature amount calculation means for calculating a feature amount of each pixel of the inspection image by processing the reference image and the inspection image; and
    a fault candidate extraction means for comparing the feature amount of each pixel with the feature amount of other pixels calculated by the feature amount calculation means, and extracting a pixel having a unique feature amount as a fault candidate,
    wherein a kind of feature amount calculated by the feature amount calculation means is changed if a kind of the fault candidate doesn't match an intended kind of fault, and
    wherein the fault candidate is inspected if the kind of the fault candidate matches the intended condition.

8. The pattern inspection apparatus according to claim 7, wherein a plurality of types of the feature amounts for extracting the fault candidates by the fault candidate extraction means are determined between the images compared for each pixel in the inspection object image.

9. The pattern inspection apparatus according to claim 8, wherein the fault candidate extraction means forms a feature space from the plurality of types of feature amounts and extracts the pixels constituting an error value as fault candidates in a feature space.

10. The pattern inspection apparatus according to claim 9, further comprising a display means for displaying information on the fault types constituting an error value in the feature space by the process executed in the fault candidate extraction means.

11. The pattern inspection apparatus according to claim 7, wherein the image acquisition means acquires the reference image and the inspection image by bright field illumination of the first and second patterns.

12. The pattern inspection apparatus according to claim 7, wherein the image acquisition means acquires the reference image of and the inspection image by dark field illumination of the first and second patterns.

* * * * *